(12) United States Patent
Okoshi et al.

(10) Patent No.: US 7,340,330 B2
(45) Date of Patent: Mar. 4, 2008

(54) HYBRID TYPE VEHICLE DRIVING CONTROLLER, HYBRID TYPE VEHICLE DRIVING CONTROL METHOD AND ITS PROGRAM

(75) Inventors: Toshio Okoshi, Anjo (JP); Hideki Hisada, Anjo (JP); Kazuo Aoki, Anjo (JP); Rie Okada, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 704 days.

(21) Appl. No.: 10/856,839

(22) Filed: Jun. 1, 2004

(65) Prior Publication Data
US 2004/0249525 A1 Dec. 9, 2004

(30) Foreign Application Priority Data
Jun. 5, 2003 (JP) ............... 2003-161339

(51) Int. Cl.
*F16H 3/72* (2006.01)
*B60K 6/04* (2006.01)
*B60L 11/14* (2006.01)

(52) U.S. Cl. .................. 701/22; 701/84; 903/923; 903/941; 903/942

(58) Field of Classification Search .............. 701/22, 701/84; 903/923, 941–942; 477/3
See application file for complete search history.

(56) References Cited

U.S. PATENT DOCUMENTS

| | | | | |
|---|---|---|---|---|
| 4,031,407 A | * | 6/1977 | Reed | 307/87 |
| 4,444,173 A | * | 4/1984 | Yamato et al. | 123/491 |
| 4,503,829 A | * | 3/1985 | Hasegawa et al. | 123/492 |
| 5,140,960 A | * | 8/1992 | Fujimoto et al. | 290/40 C |
| 5,345,154 A | * | 9/1994 | King | 318/49 |

(Continued)

FOREIGN PATENT DOCUMENTS

CN 1613682 A * 5/2005

(Continued)

OTHER PUBLICATIONS

Automotive engine control and hybrid systems: challenges and opportunities, Balluchi, A.; Benvenuti, L.; di Benedetto, M.D.; Pinello, C.; Sangiovanni-Vincentelli, A.L.; Proceedings of the IEEE, vol. 88, Issue 7, Jul. 2000 pp. 888-912 Digital Object Identifier 10.1109/5.871300.*

(Continued)

*Primary Examiner*—Cuong Nguyen
(74) *Attorney, Agent, or Firm*—Oliff & Berridge, PLC

(57) ABSTRACT

The invention has an engine maximum torque calculating processor for calculating plural engine maximum torques showing a maximum value of engine torque, and an engine limit torque calculating processor for calculating a minimum value of the respective engine maximum torques as engine limit torque. Because the minimum value of the engine maximum torques is calculated as the engine limit torque, it is possible to reliably prevent the engine from entering an excessive rotating state. Further, because the engine limit torque is calculated on the basis of the minimum value of the engine maximum torques, the engine limit torque can be reliably calculated even when there is an individual difference in the engine, an electric generator, etc. and there are calculation errors further, for example, electric generator target torque and the electric generator maximum torque.

16 Claims, 19 Drawing Sheets

U.S. PATENT DOCUMENTS

| | | | | |
|---|---|---|---|---|
| 5,400,865 | A * | 3/1995 | Togai et al. | 180/197 |
| 5,496,227 | A * | 3/1996 | Minowa et al. | 477/62 |
| 5,692,990 | A * | 12/1997 | Tsukamoto et al. | 477/93 |
| 6,037,728 | A * | 3/2000 | Petkovic | 318/364 |
| 6,098,592 | A * | 8/2000 | Hess et al. | 123/350 |
| 6,118,237 | A | 9/2000 | Kikuchi et al. | 318/139 |
| 6,150,793 | A * | 11/2000 | Lesesky et al. | 320/104 |
| 6,205,379 | B1 * | 3/2001 | Morisawa et al. | 701/22 |
| 6,223,106 | B1 * | 4/2001 | Yano et al. | 701/22 |
| 6,358,186 | B1 * | 3/2002 | Kosik et al. | 477/176 |
| 6,366,838 | B1 * | 4/2002 | Yoshino et al. | 701/22 |
| 6,701,880 | B1 * | 3/2004 | Gauthier et al. | 123/179.3 |
| 6,847,877 | B2 * | 1/2005 | Homeyer | 701/51 |
| 6,889,126 | B2 * | 5/2005 | Komiyama et al. | 701/22 |
| 6,915,782 | B2 * | 7/2005 | Hanada et al. | 123/399 |
| 7,110,871 | B2 * | 9/2006 | Hubbard et al. | 701/54 |
| 7,136,727 | B2 * | 11/2006 | Seo et al. | 701/22 |
| 7,200,476 | B2 * | 4/2007 | Cawthorne et al. | 701/51 |
| 2003/0065433 | A1 * | 4/2003 | Homeyer | 701/51 |
| 2004/0249525 | A1 * | 12/2004 | Okoshi et al. | 701/22 |
| 2005/0003926 | A1 * | 1/2005 | Hanada et al. | 477/3 |
| 2005/0121248 | A1 * | 6/2005 | Ushiroda et al. | 180/248 |

FOREIGN PATENT DOCUMENTS

| | | | |
|---|---|---|---|
| EP | 1529672 A2 * | 5/2005 | |
| JP | 2001-268713 | 9/2001 | |
| JP | A 2001-304010 | 10/2001 | |
| JP | 2003-111206 | 4/2003 | |
| JP | 2004132421 A * | 4/2004 | |
| JP | 2004360608 A * | 12/2004 | |
| JP | 2005138743 A * | 6/2005 | |

OTHER PUBLICATIONS

Making the case for applications of switched reluctance motor technology in automotive products, Krishnamurthy, M.; Edrington, C.S.; Emadi, A.; Asadi, P.; Ehsani, M.; Fahimi, B.; Power Electronics, IEEE Transactions on, vol. 21, Issue 3, May 2006 pp. 659-675, Digital Object identifier 10.1109/TPEL.2006.872371.*

Compact permanent-magnet generator for hybrid vehicle applications, Crescimbini, F.; Di Napoli, A.; Solero, L.; Caricchi, F.; Industry Applications, IEEE Transactions on, vol. 41, Issue 5, Sep.-Oct. 2005 pp. 1168-1177, Digital Object Identifier 10.1109/TIA.2005.855048.*

PM-assisted reluctance synchronous motor/generator (PM-RSM) for mild hybrid vehicles: electromagnetic design, Boldea, I.; Tutelea, L.; Pitic, C.I.; Industry Applications, IEEE Transactions on, vol. 40, Issue 2, Mar.-Apr. 2004 pp. 492-498 Digital Object Identifier 10.1109/TIA.2004.824434.*

Control of switched reluctance drives for electric vehicle applications, Inderka, R.B.; Menne, M.; De Doncker, R.W.A.A.; Industrial Electronics, IEEE Transactions on, vol. 49, Issue 1, Feb. 2002 pp. 48-53 , Digital Object Identifier 10.1109/41.982247.*

Minimization of torque ripple in SRM drives, Husain, I.; Industrial Electronics, IEEE Transactions on, vol. 49, Issue 1, Feb. 2002 pp. 28-39, Digital Object Identifier 10.1109/41.982245.*

Intelligent energy management agent for a parallel hybrid vehicle-part II: torque distribution, charge sustenance strategies, and performance results, Jong-Seob Won; Langari, R.; Vehicular Technology, IEEE Transactions on, vol. 54, Issue 3, May 2005 pp. 935-953, Digital Object Identifier 10.1109/TVT.2005.844683.*

Experimental verification of optimal flux weakening in surface PM Machines using concentrated windings, El-Refaie, A.M.; Jahns, T.M.; McCleer, P.J.; McKeever, J.W.; Industry Applications, IEEE Transactions on, vol. 42, Issue 2, Mar.-Apr. 2006 pp. 443-453, Digital Object Identifier 10.1109/TIA.2006.870043.*

Current polarity detection-based simple position sensorless drive of IPMSM for AC compressor in HEV, Kosaka, T.; Fujitsuna, M.; Takahashi, T.; Matsui, N.; Industry Applications Conference, 2004. 39th IAS Annual Meeting. Conference Record of the 2004 IEEE, vol. 1, Oct. 3-7, 2004 Pages(s), Digital Object Identifier 10.1109/IAS.2004.1348422.*

* cited by examiner

HYBRID TYPE VEHICLE DRIVING CONTROLLER, HYBRID TYPE VEHICLE DRIVING CONTROL METHOD AND ITS PROGRAM

CROSS-REFERENCE TO RELATED APPLICATION

This application claims priority from JP 2003-161339 filed Jun. 5, 2003, the disclosure of which is incorporated herein in its entirety by reference thereto.

BACKGROUND OF THE INVENTION

1. Field of Invention

The invention relates to a hybrid type vehicle driving controller, a hybrid type vehicle driving control method and its program.

2. Description of Related Art

In a hybrid type vehicle having a planetary gear unit in which, e.g., a sun gear, a ring gear and a carrier are arranged, the carrier and an engine are connected, the ring gear and a drive wheel are connected, and the sun gear and an electric generator are connected, the torque of the engine, i.e., one portion of the engine torque TE is transmitted to the electric generator, and the remaining torque is transmitted to the drive wheel together with the torque of a drive motor, i.e., drive motor torque TM.

In the hybrid type vehicle of this type, the electric generator is connected to the engine through the planetary gear unit. When an operating point of the engine, as an engine target operating state, is determined, the engine torque TE at the operating point is determined as engine target torque TE* showing a target value of the engine torque TE. The rotating speed of the engine at the operating point, i.e., an engine rotating speed NE is determined as an engine target rotating speed NE* showing a target value of the engine rotating speed NE.

The rotating speed of the electric generator, i.e., an electric generator target rotating speed NG* showing a target value of an electric generator rotating speed NG is calculated on the basis of the engine target rotating speed NE*. The torque of the electric generator, i.e., electric generator torque TG, is controlled such that the electric generator rotating speed NG becomes the electric generator target rotating speed NG*.

When the electric generator rotating speed NG is suddenly raised and the voltage of a battery, i.e., a battery voltage VB is reduced, the engine races and an excessive rotating state is caused.

FIG. 2 is a view showing the relationship of the electric generator rotating speed and the electric generator torque in the conventional hybrid type vehicle. In this figure, the electric generator rotating speed NG is set on the axis of the abscissa, and the electric generator torque TG is set on the axis of the ordinate.

Reference numerals L1 to L3 designate lines showing the relationship of the electric generator rotating speed NG, the electric generator torque TG and the battery voltage VB. As the battery voltage VB is reduced, characteristics are changed in the direction of an arrow B. As the battery voltage VB is raised, the characteristics are changed in the direction of an arrow A.

When the electric generator is operated at a driving point p1 on the line L2 in FIG. 2 and, for example, a driver suddenly applies brakes, the rotating speed of the ring gear connected to the drive wheel is suddenly reduced. Thus, the electric generator rotating speed NG is suddenly raised and the electric generator is operated at a driving point p2. As a result, because the electric generator torque TG is suddenly reduced, the engine rotating speed NE cannot be restrained by the electric generator torque TG. Therefore, the engine rotating speed NE is suddenly raised, the engine races and the excessive rotating state is caused.

Further, when the electric generator is operated at the driving point p1 and the battery voltage VB is reduced, the electric generator is operated at a driving point p3. Because the electric generator torque TG is also suddenly reduced in this case, the engine torque TE cannot be restrained by the electric generator torque TG. Therefore, the engine rotating speed NE is suddenly raised, the engine races and the excessive rotating state is caused.

Therefore, a hybrid type vehicle driving controller is arranged to prevent the engine from attaining the excessive rotating state, and various kinds of excessive rotation preventing controls are performed in the hybrid type vehicle driving controller.

Namely, in a first excessive rotation preventing control, an electric generator maximum rotating speed NGmax showing a maximum value of the electric generator rotating speed NG is set to correspond to the battery voltage VB. As the battery voltage VB is reduced, the electric generator maximum rotating speed NGmax is set to be reduced. As the battery voltage VB is raised, the electric generator maximum rotating speed NGmax is set to be raised. The engine is prevented from attaining the excessive rotating state by limiting the electric generator target rotating speed NG* so as not to exceed the electric generator maximum rotating speed NGmax.

There is a case in which the actual electric generator rotating speed NG becomes higher than the electric generator target rotating speed NG* when the electric generator target rotating speed NG* is limited in the first excessive rotation preventing control. Therefore, in a second excessive rotation preventing control, an electric generator maximum torque TGmax showing a maximum value of the electric generator torque TG is calculated corresponding to the battery voltage VB and the temperature of an inverter. An engine maximum torque TEmax, showing a maximum value of the engine torque TE, is set from the electric generator maximum torque TGmax and a gear ratio γGE from the electric generator to the engine. The engine is prevented from attaining the excessive rotating state by limiting a throttle aperture θ of the engine such that the engine torque TE does not exceed the engine maximum torque TEmax.

When the engine cannot be prevented from attaining the excessive rotating state by performing the first and second excessive rotation prevention controls, fail safe control is performed so as not to exceed an electric generator limit rotating speed NGlim (e.g., 6000 [rpm]) setting a mechanical limit rotating speed of the electric generator.

Namely, in the fail safe control, it is judged whether the electric generator rotating speed NG reaches the electric generator limit rotating speed NGlim. When the electric generator rotating speed NG reaches the electric generator limit rotating speed NGlim, the engine torque TE is compulsorily limited, the fuel supplied to the engine is cut by 100[%], and the electric generator is shut down. The fail safe control is performed to protect the electric generator, and behavior, vibration, operability, etc. of the hybrid type vehicle are not considered.

However, when the hybrid type vehicle runs in a cold place, the internal resistance of the battery is increased so that the change in the battery voltage VB becomes large.

Therefore, there is a case in which the battery voltage VB is suddenly reduced as the hybrid type vehicle is suddenly accelerated. In this case, the electric generator torque TG is reduced even when the first and second excessive rotation preventing controls are performed. Therefore, it is difficult to restrain the engine torque TE, and it is impossible to prevent the engine from attaining the excessive rotating state.

Further, when the hybrid type vehicle runs across roads having friction coefficients different from each other, e.g., when the hybrid type vehicle is moved from a road having a small friction coefficient with ice on its surface to a road having a large friction coefficient as in asphalt, the shaft of the driven wheel is locked and the rotating speed of the ring gear connected to the drive wheel is suddenly reduced so that the electric generator rotating speed NG is suddenly raised.

Accordingly, when the battery voltage VB is suddenly reduced and the electric generator rotating speed NG is suddenly raised, the first and second excessive rotation preventing controls cannot be reliably performed. As its result, it is impossible to reliably prevent the engine from attaining the excessive rotating state.

Therefore, the engine target torque TE* is calculated on the basis of the electric generator target torque TG* showing a target value of the electric generator torque TG and the electric generator maximum torque TGmax (e.g., see JP-A-2001-304010).

However, in the above conventional hybrid type vehicle driving controller, it is impossible to reliably prevent the engine from attaining the excessive rotating state when it is difficult to restrain the engine torque TE by the electric generator torque TG due to individual differences in the engine, the electric generator, etc., and a calculating error of the electric generator target torque TG*, the electric generator maximum torque TGmax, etc.

SUMMARY OF THE INVENTION

An object of the invention is to provide a hybrid type vehicle driving controller, a hybrid type vehicle driving control method and its program able to reliably prevent the engine from attaining the excessive rotating state by solving the above problem of the conventional hybrid type vehicle driving controller.

Therefore, the hybrid type vehicle driving controller of the invention comprises engine maximum torque calculation processing means for calculating plural engine maximum torques showing a maximum value of engine torque, and engine limit torque calculation processing means for calculating a minimum value of the respective engine maximum torques as an engine limit torque.

Another hybrid type vehicle driving controller of the invention further comprises an electric generator maximum torque calculation processing means for calculating an electric generator maximum torque showing a maximum value of an electric generator torque. The engine maximum torque calculation processing means calculates each engine maximum torque on the basis of the electric generator maximum torque.

Still another hybrid type vehicle driving controller of the invention comprises electric generator maximum torque calculation processing means for calculating an electric generator maximum torque showing a maximum value of an electric generator torque; electric generator target torque calculation processing means for calculating an electric generator target torque showing a target value of the electric generator torque; deficient electric generator torque calculation processing means for calculating a deficient amount of the electric generator torque on the basis of the difference between the electric generator target torque and the electric generator maximum torque; engine maximum torque calculation processing means for calculating plural engine maximum torques on the basis of at least the electric generator maximum torque and the deficient amount of the electric generator torque; and engine limit torque calculation processing means for calculating a minimum value of the respective engine maximum torques as an engine limit torque.

In the still another hybrid type vehicle driving controller of the invention, the engine maximum torque calculation processing means has first engine maximum torque calculation processing means for calculating the engine maximum torque on the basis of at least the electric generator maximum torque, and also has second engine maximum torque calculation processing means for calculating the engine maximum torque on the basis of the deficient amount of the electric generator torque.

The still another hybrid type vehicle driving controller of the invention further comprises engine torque adjustment processing means for adjusting request engine torque required in the engine on the basis of the deficient amount of the electric generator torque.

In the still another hybrid type vehicle driving controller of the invention, the electric generator maximum torque calculation processing means calculates the electric generator maximum torque on the basis of an electric generator rotating speed, a direct current voltage and the temperature of an inverter.

In the still another hybrid type vehicle driving controller of the invention, the electric generator target torque calculation processing means calculates the electric generator target torque on the basis of an electric generator rotating speed and an electric generator target rotating speed showing a target value of the electric generator rotating speed.

In the still another hybrid type vehicle driving controller of the invention, the request engine torque is set to a fixed value.

In the still another hybrid type vehicle driving controller of the invention, the request engine torque is set to engine target torque when the electric generator target torque is greater than the electric generator maximum torque.

Further, in a hybrid type vehicle driving control method of the invention, plural engine maximum torques showing a maximum value of engine torque are calculated, and a minimum value of the respective engine maximum torques is calculated as an engine limit torque.

A program of the hybrid type vehicle driving control method of the invention makes a computer function as engine maximum torque calculation processing means for calculating plural engine maximum torques showing a maximum value of engine torque, and also function as engine limit torque calculation processing means for calculating a minimum value of the respective engine maximum torques as engine limit torque.

BRIEF DESCRIPTION OF THE DRAWINGS

The invention will be described with reference to the drawings, in which.

DETAILED DESCRIPTION OF PREFERRED EMBODIMENTS

Figure 1:
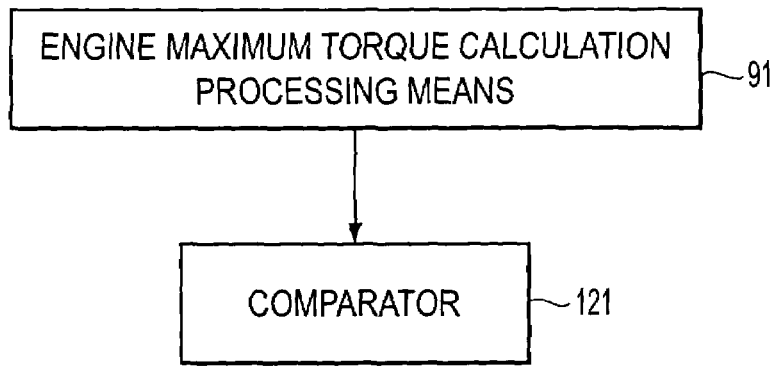
FIG. 1 is a functional block diagram of a hybrid type vehicle driving controller in a first form of the invention.
Figure 2:
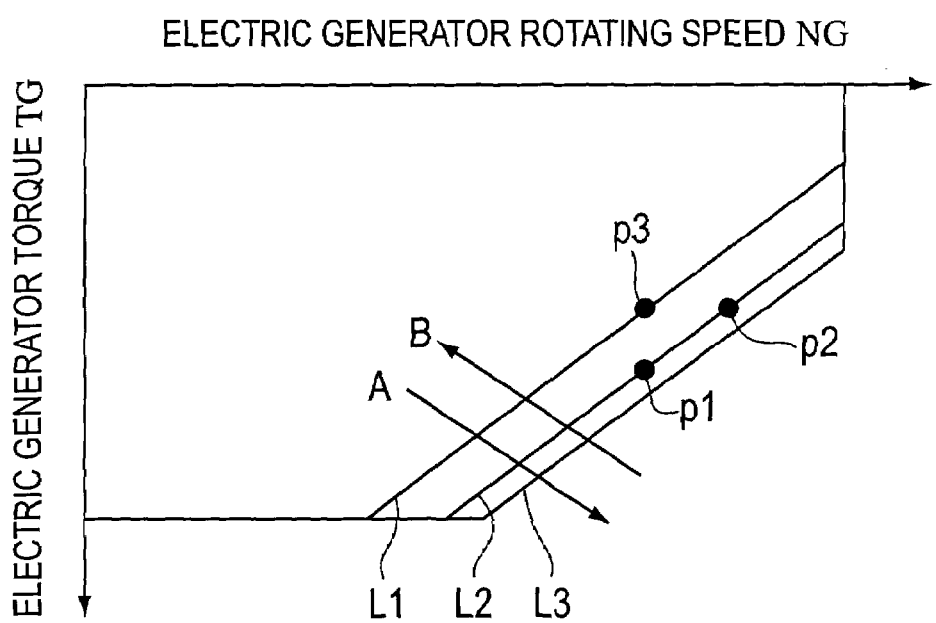
FIG. 2 is a view showing the relationship of an electric generator rotating speed and electric generator torque in a conventional hybrid type vehicle.

FIG. 1 is a functional block diagram of a hybrid type vehicle driving controller in a first form of the invention. In FIG. 1, reference numeral 91 designates an engine maximum torque calculation processing means for calculating plural engine maximum torques TEmax showing a maximum value of engine torque TE. Reference numeral 121 designates a comparator as an engine limit torque calculation processing means for calculating a minimum value of the above respective engine maximum torques TEmax as engine limit torque TEi.

The hybrid type vehicle will be explained using FIG. 3.

Figure 3:
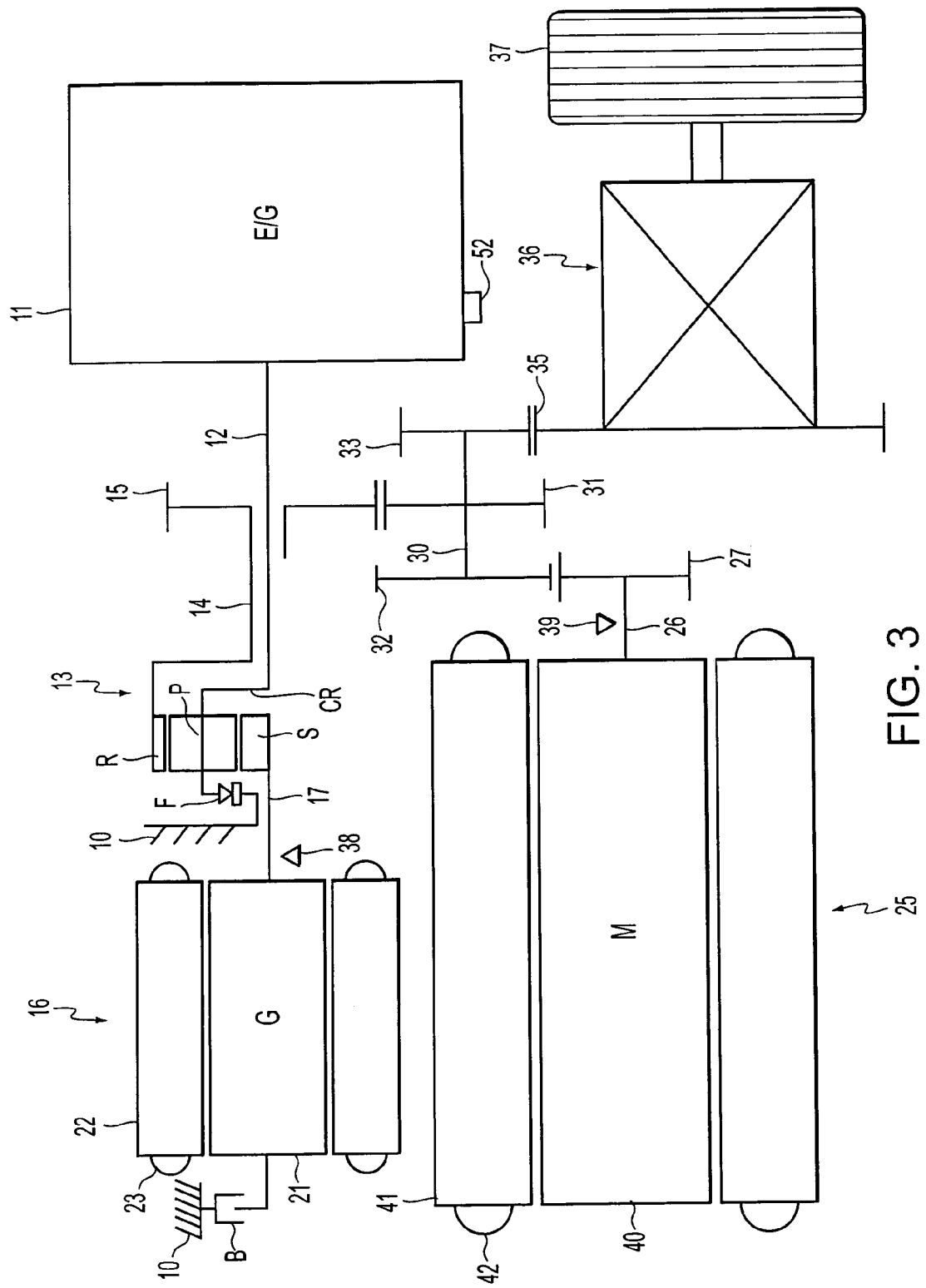
FIG. 3 is a conceptual view of the hybrid type vehicle in the first form of the invention.
Figure 4:
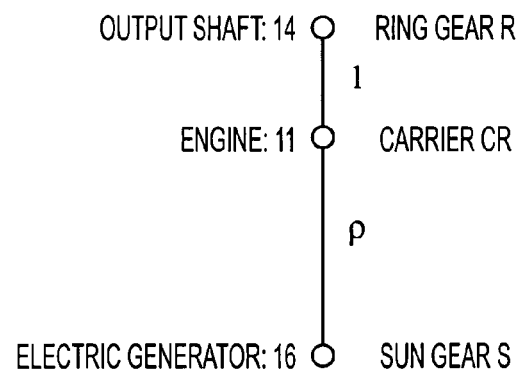
FIG. 4 is a view for explaining the operation of a planetary gear unit in the first form of the invention.

In FIG. 3, reference numerals 11, 12 respectively designate an engine (E/G) arranged on a first axial line, and an output shaft. The output shaft 12 is arranged on the first axial line, and outputs rotation generated by operating the engine 11. Reference numeral 13 designates a planetary gear unit as a differential gear device arranged on the first axial line and making a speed change with respect to the rotation inputted from the output shaft 12. Reference numeral 14 designates an output shaft arranged on the first axial line. The rotation after the speed change in the planetary gear unit 13 is outputted to the output shaft 14. Reference numeral 15 designates a first counter drive gear as an output gear fixed to the output shaft 14. Reference numeral 16 designates an electric generator (G), as a first electrically operated machine, arranged on the first axial line and connected to the planetary gear unit 13 through a transmission shaft 17. The electric generator 16 is mechanically connected to the engine 11 so as to be differentially freely rotated.

The output shaft 14 has a sleeve shape and is arranged so as to surround the output shaft 12. Further, the first counter drive gear 15 is arranged on the engine 11 side of the planetary gear unit 13.

The planetary gear unit 13 has, at least, a sun gear S as a first gear element, a pinion P engaged with the sun gear S, a ring gear R as a second gear element engaged with the pinion P, and a carrier CR as a third gear element for rotatably supporting the pinion P. The sun gear S is connected to the electric generator 16 through the transmission shaft 17. The ring gear R is connected to a drive motor (M) 25, as a second electrically operated machine, and a drive wheel 37 through the output shaft 14 and a predetermined gear series. The carrier CR is connected to the engine 11 through the output shaft 12. The drive motor 25 is arranged on a second axial line parallel to the first axial line, and is mechanically connected to the engine 11 and the electric generator 16 so as to be differentially freely rotated, and is mechanically connected to the drive wheel 37. A one-way clutch F is arranged between the carrier CR and a case 10 of a hybrid type vehicle drive device as a vehicle drive device. The one-way clutch F becomes free when the rotation in the normal direction is transmitted from the engine 11 to the carrier CR and is locked when the rotation in the reverse direction is transmitted from the electric generator 16 or the drive motor 25 to the carrier CR. Thus, no rotation in the reverse direction is transmitted to the engine 11.

The electric generator 16 has a rotor 21 fixed to the transmission shaft 17 and rotatably arranged, a stator 22 arranged around the rotor 21, and a coil 23 wound around the stator 22. The electric generator 16 generates electric power by the rotation transmitted through the transmission shaft 17. The coil 23 is connected to a battery (FIG. 7), and an alternating electric current from the coil 23 is converted into a direct electric current and is supplied to the battery. An electric generator brake B is arranged between the rotor 21 and the case 10. The rotor 21 is fixed by engaging the electric generator brake B, and the rotation of the electric generator 16 can be mechanically stopped.

Reference numeral 26 designates an output shaft arranged on the second axial line. The rotation of the drive motor 25 is outputted to the output shaft 26. Reference numeral 27 designates a second counter drive gear as an output gear fixed to the output shaft 26. The drive motor 25 has a rotor 40 fixed to the output shaft 26 and rotatably arranged, a stator 41 arranged around the rotor 40, and a coil 42 wound around the stator 41.

The drive motor 25 generates drive motor torque TM based on the electric currents of U, V and W phases as an alternating electric current supplied to the coil 42. Therefore, the coil 42 is connected to the battery, and the direct electric current from the battery is converted into the electric current of each phase and is supplied to the coil 42.

A counter shaft 30 is arranged on a third axial line parallel to the first and second axial lines to rotate the drive wheel 37 in the same direction as the rotation of the engine 11. A first counter driven gear 31 and a second counter driven gear 32, having a tooth number larger than that of the first counter driven gear 31, are fixed to the counter shaft 30. The first counter driven gear 31 and the first counter drive gear 15 are engaged with each other. The second counter driven gear 32 and the second counter drive gear 27 are engaged with each other. The rotation of the first counter drive gear 15 is inverted and transmitted to the first counter driven gear 31. The rotation of the second counter drive gear 27 is inverted and transmitted to the second counter driven gear 32.

Further, a diff-pinion gear 33, having a tooth number smaller than that of the first counter driven gear 31, is fixed to the counter shaft 30.

A differential device 36 is arranged on a fourth axial line parallel to the first to third axial lines, and a diff-ring gear 35 of the differential device 36 and the diff-pinion gear 33 are engaged with each other. Accordingly, the rotation transmitted to the differing gear 35 is distributed by the differential device 36 and is transmitted to the drive wheel 37. Thus, the rotation generated by the engine 11 can be transmitted to the first counter driven gear 31, and the rotation generated by the drive motor 25 can be also transmitted to the second counter driven gear 32. Accordingly, the hybrid type vehicle can run by operating the engine 11 and/or the drive motor 25.

Figure 7:
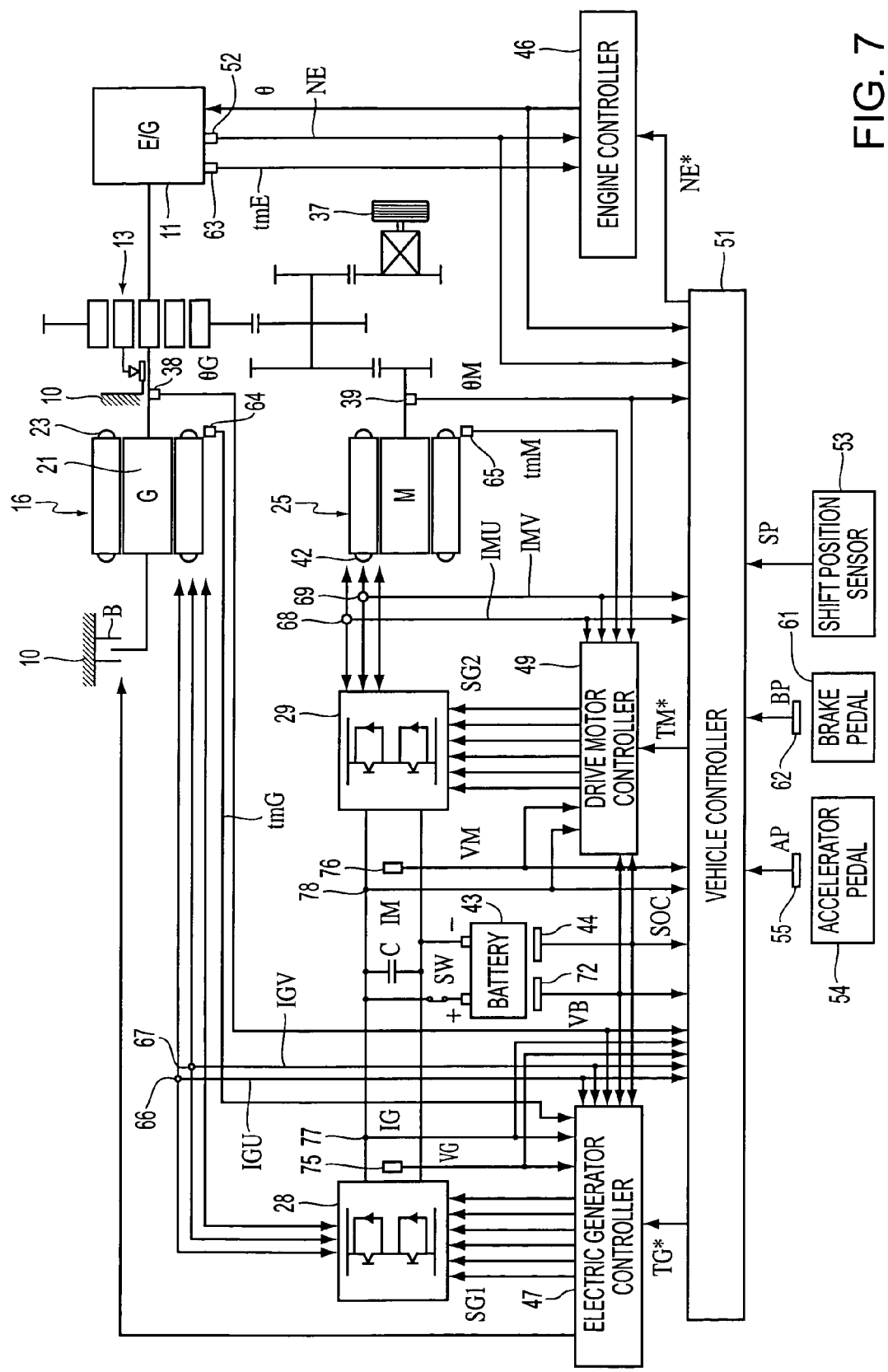
FIG. 7 is a conceptual view of the hybrid type vehicle driving controller in the first form of the invention.

Reference numeral 38 designates an electric generator rotor position sensor, such as a resolver, for detecting the position of the rotor 21, i.e., an electric generator rotor position θG. Reference numeral 39 designates a drive motor rotor position sensor, such as a resolver, for detecting the position of the rotor 40, i.e., a drive motor rotor position θM. The detected electric generator rotor position θG is sent to vehicle controller (FIG. 7) and an electric generator controller (FIG. 7). The drive motor rotor position θM is sent to the vehicle controller and a drive motor controller (FIG. 7). Further, reference numeral 52 designates an engine rotating speed sensor as an engine rotating speed detecting means for detecting the engine rotating speed NE.

In the planetary gear unit 13 (FIG. 3), the carrier CR is connected to the engine 11, the sun gear S is connected to the electric generator 16, and the ring gear R is connected to the drive motor 25 and the drive wheel 37 through the output shaft 14. Accordingly, the rotating speed of the ring gear R, i.e., a ring gear rotating speed NR, and the rotating speed outputted to the output shaft 14, i.e., an output shaft rotating speed, are equal to each other. The rotating speed of the carrier CR and the engine rotating speed NE are equal to each other. Further, the rotating speed of the sun gear S and the electric generator rotating speed NG are equal to each other. When the tooth number of the ring gear R is set to ρ times (twice in this form of the invention) the tooth number of the sun gear S, the relationship of $$(\rho+1) \cdot NE = 1 \cdot NG + \rho \cdot NR$$

is formed. Accordingly, the engine rotating speed NE where $$NE = (1 \cdot NG + \rho \cdot NR)/(\rho+1) \quad (1)$$

can be calculated on the basis of the ring gear rotating speed NR and the electric generator rotating speed NG. The rotating speed relation formula of the planetary gear unit 13 is provided by formula (1).

The engine torque TE, torque generated in the ring gear R, i.e., ring gear torque TR and electric generator torque TG have the following relationship $$TE:TR:TG=(\rho+1):\rho:1 \quad (2)$$

so that reaction forces are applied to each other. The torque relation formula of the planetary gear unit 13 is provided by formula (2).

Figure 5:
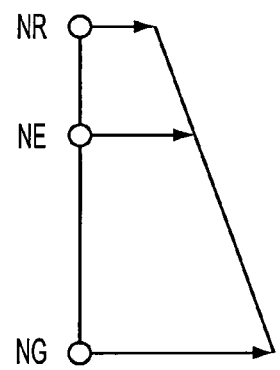
FIG. 5 is a vehicle speed diagram at a normal running time in the first form of the invention.
Figure 6:
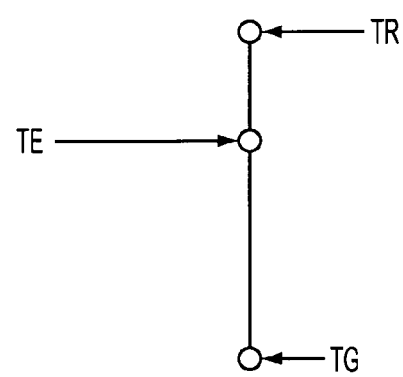
FIG. 6 is a torque diagram at the normal running time in the first form of the invention.

At the normal running time of the hybrid type vehicle, each of the ring gear R, the carrier CR and the sun gear S is rotated in the normal direction, and each of the ring gear rotating speed NR, the engine rotating speed NE and the electric generator rotating speed NG has a positive value as shown in FIG. 5. Further, the ring gear torque TR and the electric generator torque TG are obtained by proportionally dividing the engine torque TE in a torque ratio determined by the tooth number of the planetary gear unit 13. Accordingly, in the torque diagram shown in FIG. 6, torque provided by adding the ring gear torque TR and the electric generator torque TG becomes the engine torque TE.

The hybrid type vehicle driving controller for controlling the operation of the hybrid type vehicle will next be explained.

In FIG. 7, reference numerals 10, 11, 13 respectively designate the case, the engine (E/G) and the planetary gear unit. Reference numerals 16, B, 25 respectively designate the electric generator (G), the electric generator brake for fixing the rotor 21 of the electric generator 16, and the drive motor (M). Reference numerals 28, 29, 37 respectively designate an electric generator inverter for operating the electric generator 16, a drive motor inverter for driving the drive motor 25, and the drive wheel. Reference numerals 38, 39, 43 respectively designate the electric generator rotor position sensor, the drive motor rotor position sensor, and the battery. The inverters 28, 29 are connected to the battery 43 through a power switch SW. The battery 43 supplies a direct electric current to the inverters 28, 29 when the power switch SW is turned on.

An electric generator inverter voltage sensor 75, as a first direct voltage detecting section, is arranged on the inlet side of the inverter 28 to detect a direct voltage applied to the inverter 28, i.e., an electric generator inverter voltage VG. An electric generator inverter electric current sensor 77, as a first direct electric current detecting section, is arranged to detect the direct electric current supplied to the inverter 28, i.e., an electric generator inverter electric current IG. Further, a drive motor inverter voltage sensor 76, as a second direct voltage detecting section, is arranged on the inlet side of the inverter 29 to detect the direct voltage applied to the inverter 29, i.e., a drive motor inverter voltage VM. A drive motor inverter electric current sensor 78, as a second direct electric current detecting section, is arranged to detect the direct electric current supplied to the inverter 29, i.e., a drive motor inverter electric current IM. The electric generator inverter voltage VG and the electric generator inverter electric current IG are sent to the vehicle controller 51 and the electric generator controller 47. The drive motor inverter voltage VM and the drive motor inverter electric current IM are sent to the vehicle controller 51 and the drive motor controller 49. A smoothing capacitor C is connected between the battery 43 and the inverters 28, 29. Further, an inverter temperature sensor (not shown), as an inverter temperature detecting section, is arranged to detect the temperature of each of the inverters 28, 29.

The vehicle controller 51 comprises a CPU, recorder or memory, etc. (not shown), controls the operation of the entire hybrid type vehicle driving controller, and functions as a computer on the basis of various kinds of programs, data, etc. An engine controller 46, the electric generator controller 47 and the drive motor controller 49 are connected to the vehicle controller 51. The engine controller 46 comprises a CPU, recorder or memory, etc. (not shown), and sends an instruction signal for a throttle aperture θ, valve timing, etc. to the engine 11 so as to control the operation of the engine 11. The electric generator controller 47 comprises a CPU, recorder or memory, etc. (not shown), and sends a driving signal SG1 to the inverter 28 so as to control the operation of the electric generator 16. The drive motor controller 49 comprises a CPU, recorder or memory, etc. (not shown), and sends a driving signal SG2 to the inverter 29 so as to control the operation of the drive motor 25. A first controller subordinate to the vehicle controller 51 is provided by the engine controller 46, the electric generator controller 47 and the drive motor controller 49. A second controller superior to the engine controller 46, the electric generator controller 47 and the drive motor controller 49 is provided by the vehicle controller 51. Further, the engine controller 46, the electric generator controller 47 and the drive motor controller 49 also function as a computer on the basis of various kinds of programs, data, etc.

The inverter 28 is operated by the driving signal SG1, and generates electric currents IGU, IGV, IGW of respective phases upon receiving the direct electric current from the battery 43 at a power applying time. The inverter 28 further supplies the electric currents IGU, IGV, IGW of the respective phases to the electric generator 16, receives the electric currents IGU, IGV, IGW of the respective phases from the electric generator 16 at a regenerative time, and generates the direct electric current and supplies the direct electric current to the battery 43.

The inverter 29 is operated in accordance with the driving signal SG2, and generates electric currents IMU, IMV, IMW of respective phases upon receiving the direct electric current from the battery 43 at the power applying time. The inverter 29 further supplies the electric currents IMU, IMV, IMW of the respective phases to the drive motor 25, receives the electric currents IMU, IMV, IMW of the respective phases from the drive motor 25 at the regenerative time, and generates the direct electric current and supplies the direct electric current to the battery 43.

Reference numeral 44 designates a battery remaining amount detector for detecting a state of the battery 43, i.e., the battery remaining amount SOC as the battery state. Reference numerals 52, 53, 54 respectively designate the engine rotating speed sensor, a shift position sensor for detecting the position of shift lever (not shown) as a selecting speed operating means, i.e., a shift position SP, and an accelerator pedal. Reference numeral 55 designates an accelerator switch, as an accelerator operation detecting section, for detecting the position (stepping-on amount) of the accelerator pedal 54, i.e., an accelerator pedal position AP. Reference numerals 61, 62 respectively designate a brake pedal and a brake switch, as a brake operation detecting section, for detecting the position (stepping-on amount) of the brake pedal 61, i.e., a brake pedal position BP. Reference numerals 63, 64 respectively designate an engine temperature sensor for detecting the temperature tmE of the engine 11, and an electric generator temperature sensor, as a temperature detecting section, for detecting the temperature of the electric generator 16, e.g., the temperature tmG of the coil 23 (FIG. 3). Reference numeral 65 designates a drive motor temperature sensor, as a temperature detecting section, for detecting the temperature of the drive motor 25, e.g., the temperature tmM of the coil 42.

Reference numerals 66 to 69 respectively designate electric current sensors, as an alternating electric current detecting section, for detecting electric currents IGU, IGV, IMU, IMV of the respective phases. Reference numeral 72 designates a battery voltage sensor, as a voltage detecting section, for the battery 43 for detecting the battery voltage VB as the battery state. The battery voltage VB is sent to the electric generator controller 47, the drive motor controller 49 and the vehicle controller 51. Further, the battery electric current, the battery temperature, etc. can also be detected as the battery state. A battery state detecting section is made up of the battery remaining amount detector 44, the battery voltage sensor 72, battery electric current sensor (not shown), battery temperature sensor (not shown), etc. Further, the electric currents IGU, IGV are sent to the electric generator controller 47 and the vehicle controller 51. The electric currents IMU, IMV are sent to the drive motor controller 49 and the vehicle controller 51.

The vehicle controller 51 sends an engine control signal to the engine controller 46, and sets the starting and stoppage of the engine 11 by the engine controller 46. Further, vehicle speed calculation processing means (not specifically shown) of the vehicle controller 51 performs vehicle speed calculation processing, calculates a changing ratio ΔθM of the drive motor rotor position θM, and also calculates a vehicle speed V on the basis of the changing ratio ΔθM and a gear ratio γV in a torque transmission system from the output shaft 26 to the drive wheel 37.

The vehicle controller 51 sets an engine target rotating speed NE*, an electric generator target torque TG*, and a drive motor target torque TM* showing a target value of the drive motor torque TM. The electric generator controller 47 sets an electric generator target rotating speed NG*. The drive motor controller 49 sets a drive motor torque correcting value δTM showing a correcting value of the drive motor torque TM. A control command value is derived from the engine target rotating speed NE*, the electric generator target torque TG*, the drive motor target torque TM*, etc.

An electric generator rotating speed calculation processing means (not specifically shown) of the electric generator controller 47 performs electric generator rotating speed calculation processing, reads the electric generator rotor position θG, and calculates the electric generator rotating speed NG by calculating a changing ratio ΔθG of the electric generator rotor position θG.

A drive motor rotating speed calculation processing means (not specifically shown) of the drive motor controller 49 performs drive motor rotating speed calculation processing, reads the drive motor rotor position θM, and calculates the rotating speed of the drive motor 25, i.e., a drive motor rotating speed NM by calculating a changing ratio ΔθM of the drive motor rotor position θM.

The electric generator rotor position θG and the electric generator rotating speed NG are proportional to each other. Further, the drive motor rotor position θM, the drive motor rotating speed NM, and the vehicle speed V are proportional to each other. Accordingly, the electric generator rotor position sensor 38 and the electric generator rotating speed calculation processing means can function as an electric generator rotating speed detecting section for detecting the electric generator rotating speed NG. The drive motor rotor position sensor 39 and the drive motor rotating speed calculation processing means can function as a drive motor rotating speed detecting section for detecting the drive motor rotating speed NM. The drive motor rotor position sensor 39 and the vehicle speed calculation processing means can function as a vehicle speed detecting section for detecting the vehicle speed V.

In this form, the engine rotating speed NE is detected by the engine rotating speed sensor 52, but can also be calculated in the engine controller 46. Further, in this form, the vehicle speed V is calculated by the vehicle speed calculation processing means on the basis of the drive motor rotor position θM. However, the vehicle speed V can also be calculated on the basis of the ring gear rotating speed NR by detecting the ring gear rotating speed NR, and can also be calculated on the basis of the rotating speed of the drive wheel 37, i.e., a drive wheel rotating speed. In this case, a ring gear rotating speed sensor and/or a drive wheel rotating speed sensor are provided as a vehicle speed detecting section.

Figure 9:
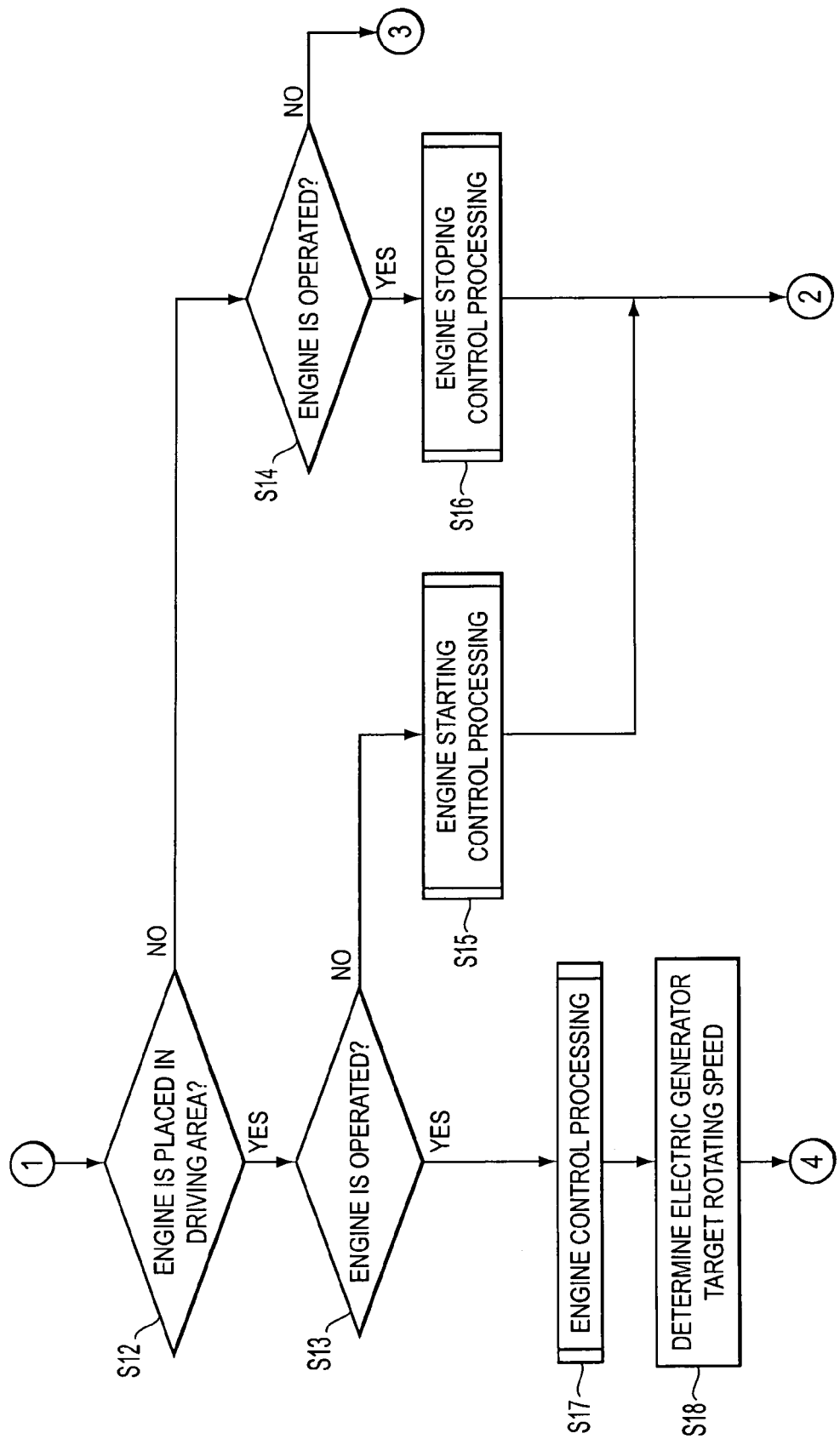
FIG. 9 is a second portion of a main flow chart showing the operation of the hybrid type vehicle driving controller in the first form of the invention.
Figure 10:
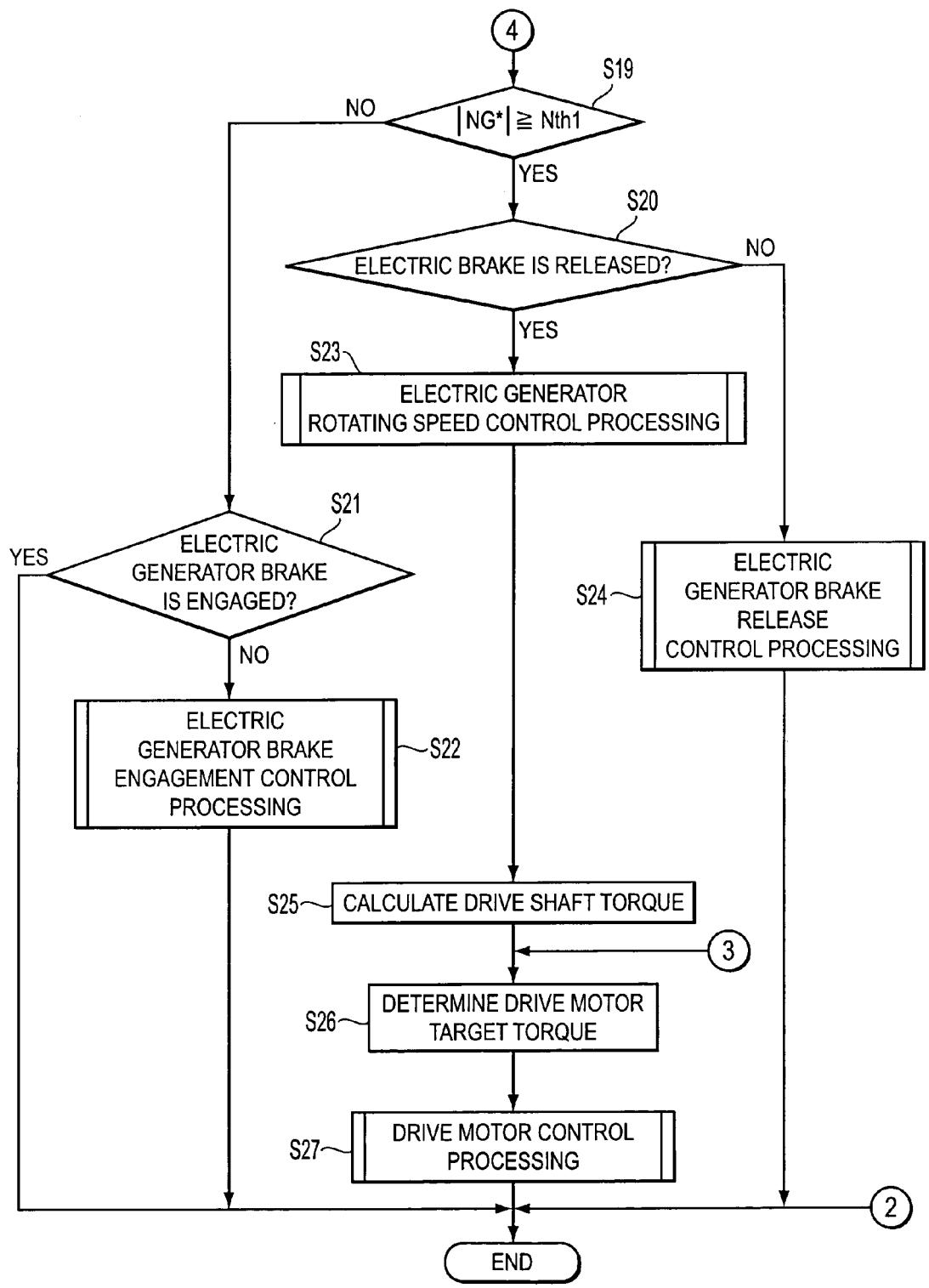
FIG. 10 is a third portion of a main flow chart showing the operation of the hybrid type vehicle driving controller in the first form of the invention.
Figure 11:
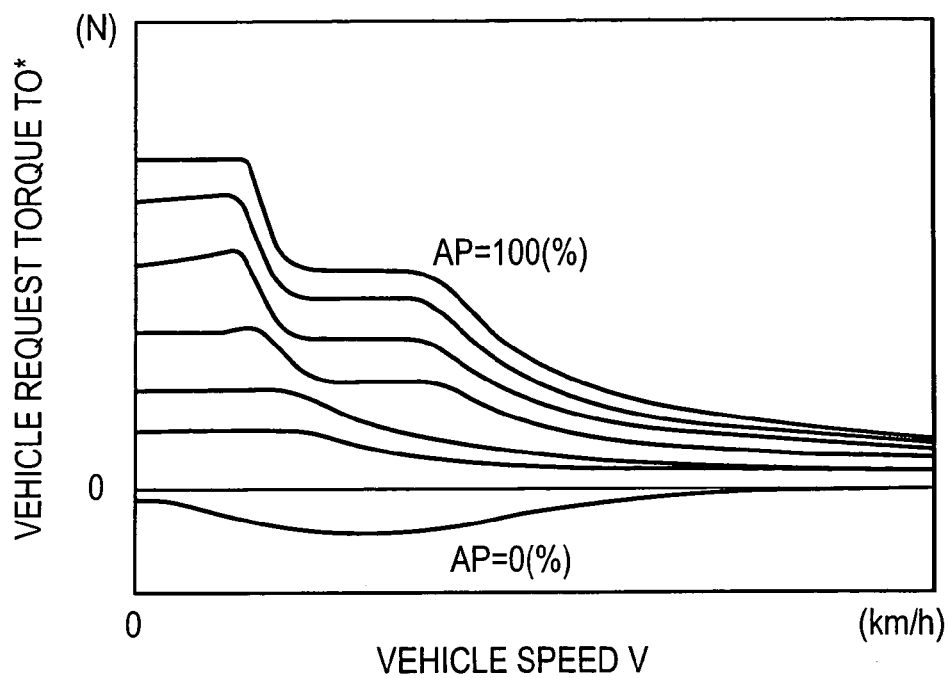
FIG. 11 shows a first vehicle request torque map in the first form of the invention.
Figure 12:
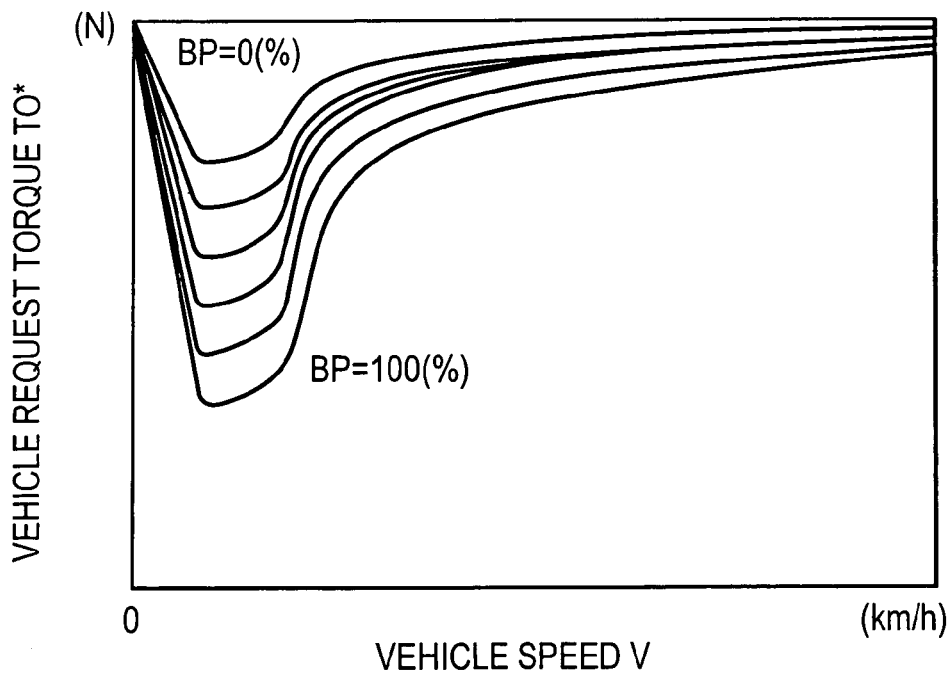
FIG. 12 shows a second vehicle request torque map in the first form of the invention.
Figure 13:
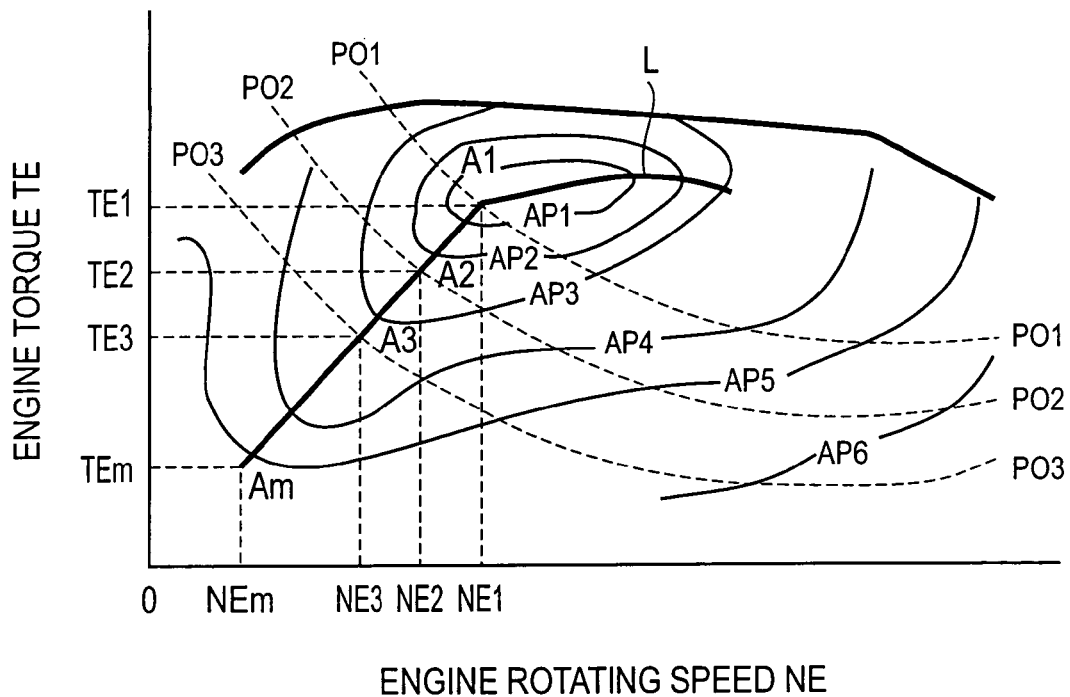
FIG. 13 shows an engine target operating state map in the first form of the invention.
Figure 14:
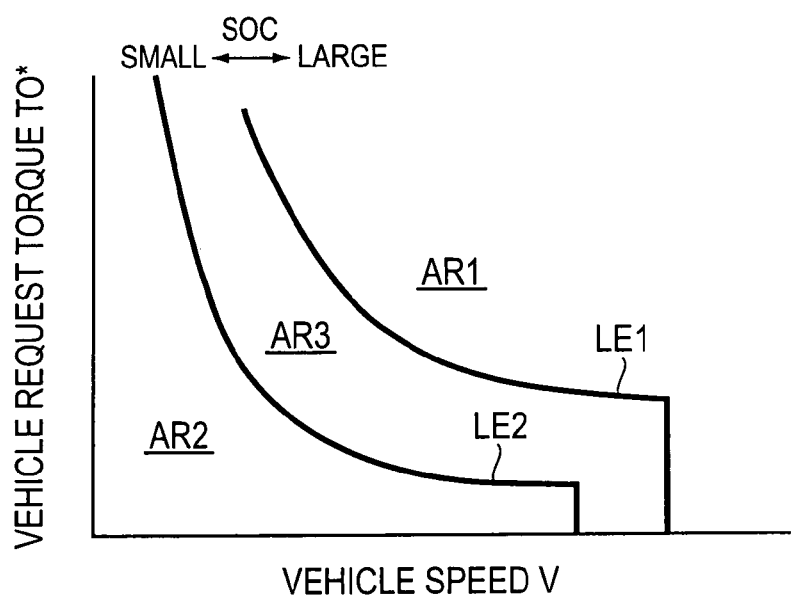
FIG. 14 shows an engine driving area map in the first form of the invention.

The operation of the hybrid type vehicle driving controller will now be explained using FIGS. 8-14. In FIGS. 11, 12 and 14, the vehicle speed V is set on the axis of abscissa and vehicle request torque TO* is set on the axis of ordinate. In FIG. 13, the engine rotating speed NE is set on the axis of abscissa and the engine torque TE is set on the axis of ordinate.

First, in step S1, an initialization processing means (not specifically shown) of the vehicle controller 51 (FIG. 7) sets various kinds of variables to initial values by performing initialization processing. Next, in step S2 the vehicle controller 51 reads the accelerator pedal position AP from the accelerator switch 55 and the brake pedal position BP from the brake switch 62. Then in step S3, the vehicle speed calculation processing means reads the drive motor rotor position θM, calculates the changing ratio ΔθM of the drive motor rotor position θM, and also calculates the vehicle speed V on the basis of the changing ratio ΔθM and the gear ratio γV.

Subsequently, in step S4 a vehicle request torque determination processing means (not specifically shown) of the vehicle controller 51 performs vehicle request torque determination processing, referring to the first vehicle request torque map of FIG. 11 recorded, or stored, in the recorder, or memory, of the vehicle controller 51, when the accelerator pedal 54 is stepped on. The vehicle request torque determination processing means of the vehicle controller 51 also refers to the second vehicle request torque map of FIG. 12 recorded in the recorder when the brake pedal 61 is stepped on. The vehicle request torque determination processing means of the vehicle controller 51 then determines the vehicle request torque TO* required to run the hybrid type vehicle and set in advance corresponding to the accelerator pedal position AP, the brake pedal position BP, and the vehicle speed V.

Subsequently, the vehicle controller 51 judges whether the vehicle request torque TO* is greater than drive motor maximum torque TMmax showing a maximum value of the drive motor torque TM in step S5. When the vehicle request torque TO* is greater than the drive motor maximum torque TMmax, in step S6 the vehicle controller 51 judges whether the engine 11 is stopped. When the engine 11 is stopped, a sudden acceleration control processing means (not specifically shown) of the vehicle controller 51 performs sudden acceleration control processing in step S7, and the hybrid type vehicle is run by driving the drive motor 25 and the electric generator 16.

In contrast to this, when the vehicle request torque TO* is the drive motor maximum torque TMmax or less, or when the vehicle request torque TO* is greater than the drive motor maximum torque TMmax and the engine 11 is operated, then, in step S8 driver request output calculation processing means (not specifically shown) of the vehicle controller 51 performs driver request output calculation processing, and calculates driver request output PD where $$PD=TO^* \cdot V$$

by multiplying the above vehicle request torque TO* and the vehicle speed V.

Next, in step S9, battery charge-discharge request output calculation processing means (not specifically shown) of the vehicle controller 51 performs battery charge-discharge request output calculation processing, reads the battery remaining amount SOC from the battery remaining amount detector 44, and calculates a battery charge-discharge request output PB on the basis of the battery remaining amount SOC.

Subsequently, in step S10, vehicle request output calculation processing means (not specifically shown) of the vehicle controller 51 performs vehicle request output calculation processing, and calculates a vehicle request output PO where $$PO=PD+PB$$

by adding the driver request output PD and the battery charge-discharge request output PB.

Next, in step S12 an engine target operating state setting processing means (not specifically shown) of the vehicle controller 51 performs engine target operating state setting processing, and refers to the engine target operating state map of FIG. 13 recorded in the recorder of the vehicle controller 51. The engine target operating state setting processing means then determines points A1 to A3, Am as operating points of the engine 11 as an engine target operating state. At the points A1 to A3, Am, lines PO1, PO2,— showing the vehicle request output PO, and an optimum fuel cost curve L, highest in efficiency of the engine 11 in each of the accelerator pedal positions AP1 to AP6, cross each other. The engine target operating state setting processing means also determines engine torques TE1 to TE3, TEm at the operating points as engine target torque TE* showing a target value of the engine torque TE. The engine target operating state setting processing means of the vehicle controller 51 also determines engine rotating speeds NE1 to NE3, NEm at the operating points as the engine target rotating speed NE*, and sends the engine target rotating speed NE* to the engine controller 46.

The engine controller 46 then refers to the engine driving area map of FIG. 14 recorded to the recorder of the engine controller 46, and judges whether the engine 11 is placed in a driving area AR1. In FIG. 14, reference numerals AR1, AR2 and AR3 respectively designate a driving area for operating the engine 11, a stopping area for stopping the operation of the engine 11, and a hysteresis area. Further, reference numerals LE1, LE2 respectively designate a line for operating the stopped engine 11, and a line for stopping the operation of the operated engine 11. The line LE1 is moved rightward in FIG. 14 and the driving area AR1 is narrowed as the battery remaining amount SOC is increased. The above line LE1 is moved leftward in FIG. 14 and the driving area AR1 is widened as the battery remaining amount SOC is reduced.

When the engine 11 is not operated although the engine 11 is placed in the driving area AR1 (step S12 yes, step S13 no), an engine starting control processing means (not specifically shown) of the engine controller 46 performs engine starting control processing and starts the engine 11 in step S15.

Further, when the engine 11 is operated although the engine 11 is not placed in the driving area AR1 (step S12 no, step S14 yes), an engine stopping control processing means (not specifically shown) of the engine controller 46 performs engine stopping control processing and stops the operation of the engine 11 in step S16. When the engine 11 is not placed in the driving area AR1 and engine 11 is not operated (steps S12 and S13 no), a drive motor target torque calculation processing means (not specifically shown) of the vehicle controller 51 performs drive motor target torque calculation processing in step S26 and determines the vehicle request torque TO* as a drive motor target torque TM*, and sends the drive motor target torque TM* to the drive motor controller 49. A drive motor control processing means (not specifically shown) of the drive motor controller 49 performs drive motor control processing and performs torque control of the drive motor 25 in step S27.

When the engine 11 is placed in the driving area AR1 and the engine 11 is operated (steps S12 and S13 yes), an engine control processing means (not specifically shown) of the engine controller 46 performs engine control processing and controls the operation of the engine 11 by a predetermined method in step S17.

Following step S17, in step S18, an electric generator target rotating speed calculation processing means (not specifically shown) of the electric generator controller 47 performs electric generator target rotating speed calculation processing and reads the drive motor rotor position θM from the drive motor rotor position sensor 39. The electric generator target rotating speed calculation processing means then calculates the ring gear rotating speed NR on the basis of the drive motor rotor position θM and a gear ratio γMR from the output shaft 26 (FIG. 3) to the ring gear R. The electric generator target rotating speed calculation processing means also reads the engine target rotating speed NE* determined in the engine target operating state setting processing, and determines the electric generator target rotating speed NG* using the rotating speed relation formula (1) on the basis of the ring gear rotating speed NR and the engine target rotating speed NE*.

When the hybrid type vehicle runs by operating the engine 11 and the drive motor 25 and the electric generator rotating speed NG is low, electric power consumption is increased, electricity generating efficiency of the electric generator 16 is reduced, and fuel cost of the hybrid type vehicle correspondingly gets worse. Therefore, when the absolute value of the electric generator target rotating speed NG* is smaller than a predetermined rotating speed, the electric generator brake B is engaged and the operation of the electric generator 16 is mechanically stopped such that the fuel cost is improved.

Therefore, the electric generator controller 47 judges in step S21 whether the absolute value of the electric generator target rotating speed NG* is equal to or greater than a predetermined first rotating speed Nth1 (e.g., 500 [rpm]). When the absolute value of the electric generator target rotating speed NG* is equal or greater than the first rotating speed Nth1, the electric generator controller 47 judges whether the electric generator brake B is released in step S20. When the electric generator brake B is released, an electric generator rotating speed control processing means (not specifically shown) of the electric generator controller 47 performs electric generator rotating speed control processing and performs torque control of the electric generator 16 in step S23. Conversely, when the electric generator brake B is not released (step S20 no), an electric generator brake release control processing means (not specifically shown) of the electric generator controller 47 performs electric generator brake release control processing and releases the electric generator brake B in step S24.

When the electric generator target torque TG* is determined in the above electric generator rotating speed control processing of step S23 and the torque control of the electric generator 16 is performed on the basis of the electric generator target torque TG* and predetermined electric generator torque TG is generated, reaction forces are mutually applied to the engine torque TE, the ring gear torque TR and the electric generator torque TG as mentioned above. Accordingly, the electric generator torque TG is converted into the ring gear torque TR and is outputted from the ring gear R.

When the electric generator rotating speed NG is changed and the ring gear torque TR is changed as the ring gear torque TR is outputted from the ring gear R, the changed ring gear torque TR is transmitted to the drive wheel 37 and a running feeling of the hybrid type vehicle is reduced. Therefore, the ring gear torque TR is calculated by expecting the inertia torque (inertias of the rotor 21 and a rotor shaft) amount of the electric generator 16 caused by changing the electric generator rotating speed NG.

Therefore, ring gear torque calculation processing means (not specifically shown) of the vehicle controller 51 performs ring gear torque calculation processing and reads the electric generator target torque TG* and calculates the ring gear torque TR on the basis of the electric generator target torque TG* and a ratio of the tooth number of the ring gear R with respect to the tooth number of the sun gear S.

Namely, when the inertia of the electric generator 16 is set to InG and the angular acceleration (rotation changing ratio) of the electric generator 16 is set to αG, torque applied to the sun gear S, i.e., sun gear torque TS is obtained by adding a torque equivalent component (inertia torque) TGI where $$TGI = InG \cdot \alpha G$$

of the inertia InG amount to the electric generator target torque TG*. Thus, the following formula is formed.

$$TS = TG^* + TGI$$

$$= TG^* + InG \cdot \alpha G. \qquad (3)$$

The torque equivalent component TGI normally has a negative value with respect to the accelerating direction during the acceleration of the hybrid type vehicle, and also has a positive value with respect to the accelerating direction during the deceleration of the hybrid type vehicle. The angular acceleration αG is calculated by differentiating the electric generator rotating speed NG.

When the tooth number of the ring gear R is set to ρ times the tooth number of the sun gear S, the ring gear torque TR is ρ times the sun gear torque TS. Accordingly, the following formula is formed.

$$TR = \rho \cdot TS$$

$$= \rho \cdot (TG^* + TGI)$$

$$= \rho \cdot (TG^* + InG \cdot \alpha G). \qquad (4)$$

Thus, the ring gear torque TR can be calculated from the electric generator target torque TG* and the torque equivalent component TGI.

Therefore, a drive shaft torque presumption processing means (not specifically shown) of the drive motor controller 49 performs drive shaft torque presumption processing and calculates the torque in the output shaft 26, i.e., drive shaft torque TR/OUT on the basis of the electric generator target torque TG* and the torque equivalent component TGI in step S25. Namely, the drive shaft torque presumption processing means calculates the drive shaft torque TR/OUT on the basis of the ring gear torque TR and a ratio of the tooth number of the second counter drive gear 27 with respect to the tooth number of the ring gear R.

Because the electric generator target torque TG* is set to zero (0) when the electric generator brake B is engaged, the ring gear torque TR has a proportional relationship with respect to the engine torque TE. Therefore, when the electric generator brake B is engaged, the drive shaft torque presumption processing means reads the engine torque TE from the engine controller 46 and calculates the ring gear torque TR by the torque relation formula (1) on the basis of the engine torque TE. The drive shaft torque presumption processing means further calculates the drive shaft torque TR/OUT on the basis of the ring gear torque TR and the ratio of the tooth number of the second counter drive gear 27 with respect to the tooth number of the ring gear R.

Subsequently, the drive motor target torque calculation processing means performs the drive motor target torque calculation processing in step S26, and subtracts the drive shaft torque TR/OUT from the vehicle request torque TO*. Thus, the drive motor target torque calculation processing means calculates and determines an excessive or deficient amount in the drive shaft torque TR/OUT as the drive motor target torque TM*.

The drive motor control processing means then performs the drive motor control processing and performs torque control of the drive motor 25 on the basis of the determined drive motor target torque TM*, and controls the drive motor torque TM (step S27).

Further, when the absolute value of the electric generator target rotating speed NG* is smaller than the first rotating speed Nth1 (step S19 no), the electric generator controller 47 judges whether the electric generator brake B is engaged in step S21. When the electric generator brake B is not engaged, an electric generator brake engagement control processing means (not specifically shown) of the electric generator controller 47 performs electric generator brake engagement control processing and engages the electric generator brake B in step S22.

Figure 8:
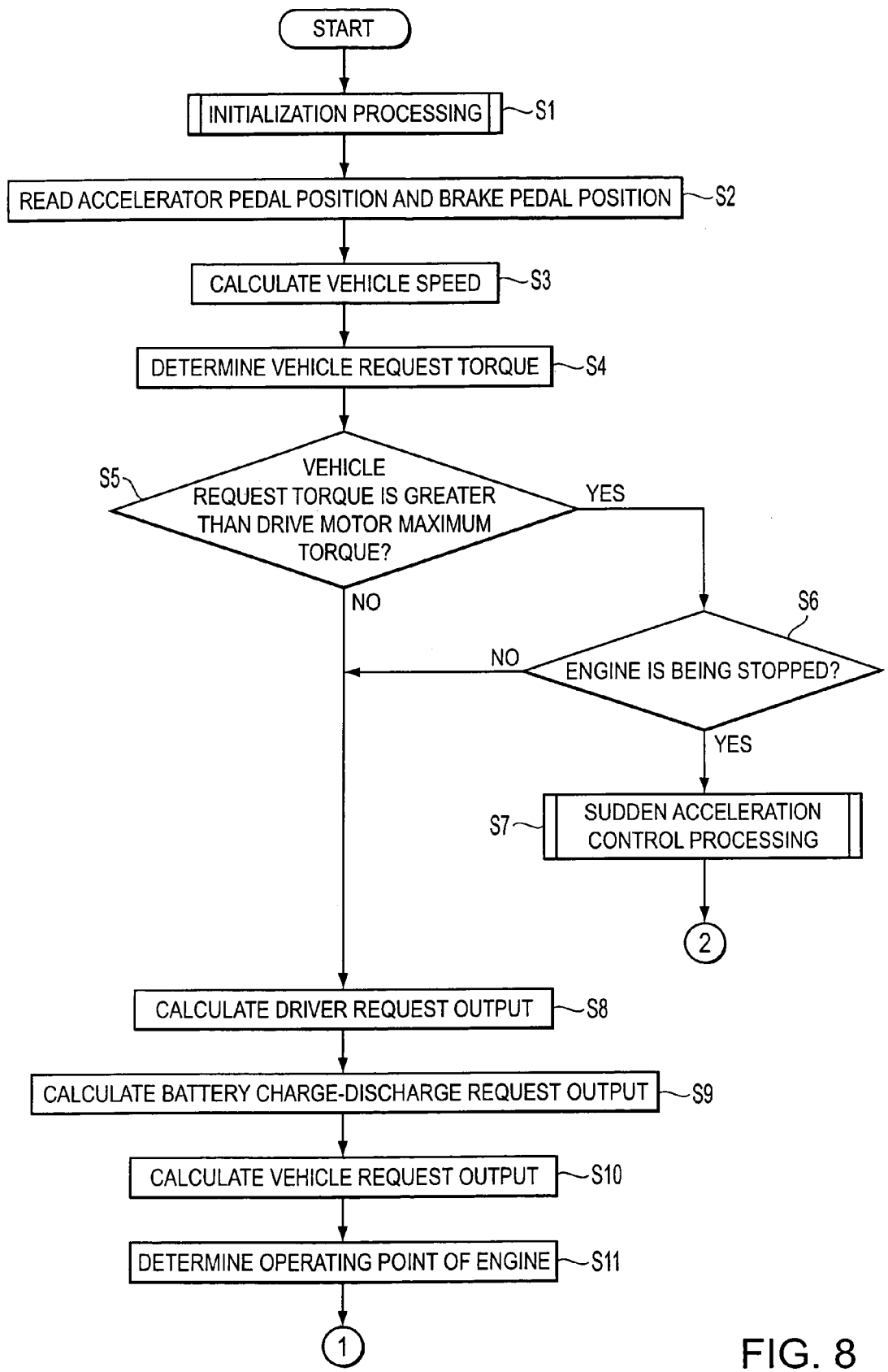
FIG. 8 is a first portion of a main flow chart showing the operation of the hybrid type vehicle driving controller in the first form of the invention.

The flow charts of FIGS. 8-10 described in detail above are summarized as follows:

In step S1 initialization processing is performed followed by step S2 in which the accelerator pedal position AP and the brake pedal position BP are read. Then, in step S3 the vehicle speed V is calculated and in step S4 a vehicle request torque TO* is determined.

In step S5 a judgment is made whether the vehicle request torque TO* is greater than the drive motor maximum torque TMmax. When the vehicle request torque TO* is greater than the drive motor maximum torque TMmax, the process proceeds to step S6. Conversely, when the vehicle request torque TO* is less than or equal to the drive motor maximum torque TMmax, the process proceeds to step S8. In step S6, it is judged whether the engine 11 is stopped. When the engine 11 is stopped, the process proceeds to step S7 and when the engine 11 is not stopped (is being operated), the process proceeds to the step S8.

When the engine 11 is stopped (step S6 yes), in step S7 a sudden acceleration control processing is performed. However, when the vehicle request torque TO* is less than or equal to the drive motor maximum torque TMmax (step S5 no) or the vehicle request torque TO* is greater than the drive motor maximum torque TMmax (step S5 yes) and the engine 11 is not stopped (step S6 no), in step S8 a driver request output PD is calculated.

In step S9 a battery charge-discharge request output PB is calculated, in step S10 a vehicle request output PO is calculated, and in step S11 the operating point of the engine 11 is determined.

In step S12 it is judged whether the engine 11 is placed in the driving area AR1. When the engine 11 is placed in the driving area AR1, the process proceeds to step S13. Conversely, when the engine 11 is not placed in the driving area AR1, the process proceeds to step S14. In step S13, after it is determined the engine 11 is placed in the driving area AR1 in step S12, it is judged whether the engine 11 is operated. When the engine 11 is operated, the process proceeds to step S117 and when the engine 11 is not operated, the process proceeds to step S15.

Following step S12 no, in step S14, it is judged whether the engine 11 is operated. When the engine 11 is operated, the process proceeds to step S16 in which engine stopping control processing is performed. Conversely, when the engine 11 is not operated in step S14, the process proceeds to step S26.

Following step S13 no, the engine is not operated, in step S15 an engine starting control processing is performed. On the other hand, following step S13 yes, in step S17 an engine control processing is performed and, then, processing proceeds to step S18 where the electric generator target rotating speed NG* is determined.

In step S19, it is judged whether the absolute value of the electric generator target rotating speed NG* is equal to or greater than the first rotating speed Nth1. When the absolute value of the electric generator target rotating speed NG* is equal to or greater than the first rotating speed Nth1, processing proceeds to step S20. Conversely, when the absolute value of the electric generator target rotating speed NG* is less than the first rotating speed Nth1, processing proceeds to step S21.

In step S20 it is judged whether the electric generator brake B is released. When the electric generator brake B is released, processing proceeds to step S23; when the electric generator brake B is not released, processing proceeds to step S24.

In step S21 (after step S19 no), it is judged whether the electric generator brake B is engaged. When the electric generator brake B is engaged, the processing is terminated and when the electric generator brake B is not engaged, the process proceeds to step S22 where electric generator brake engagement control processing is performed and then the processing is terminated.

Back, after step S20 yes, in step S23 an electric generator rotating speed control processing is performed and after S20 no, in step S24 an electric generator brake release control processing is performed. Following step S24 the processing is terminated.

Following step S23, in step S25 a drive shaft torque TR/OUT is calculated and in step S26 a drive motor target torque TM* is determined. Then, in step S27 a drive motor control processing is performed followed by terminating the processing.

Figure 15:
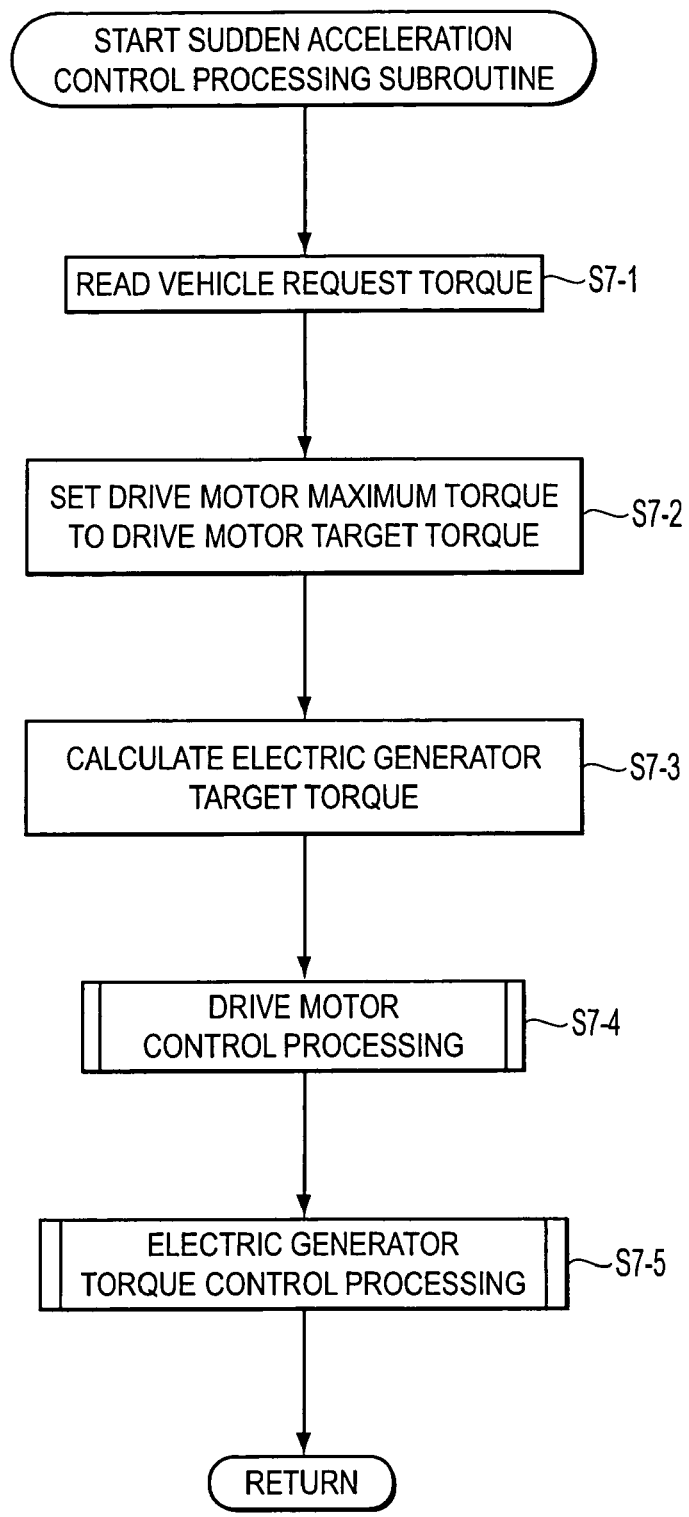
FIG. 15 is a flowchart of a subroutine of sudden acceleration control processing in the first form of the invention.

The subroutine for the sudden acceleration control processing, found in the step S7 of FIG. 8, will next be explained using FIG. 15.

First, in step S7-1, the sudden acceleration control processing means reads the vehicle request torque TO* and then, in step S7-2, sets the drive motor maximum torque TMmax to the drive motor target torque TM*. Subsequently, in step S7-3 an electric generator target torque calculation processing means (not specifically shown) of the vehicle controller 51 (FIG. 7) performs electric generator target torque calculation processing and calculates the difference torque ΔT between the vehicle request torque TO* and the drive motor target torque TM*. The electric generator target torque calculation processing means of the vehicle controller 51 also calculates and determines a deficient amount in the drive motor maximum torque TMmax being the drive motor target torque TM* as the electric generator target torque TG*, and sends the electric generator target torque TG* to the electric generator controller 47.

The drive motor control processing means then performs, in step 7-4, the drive motor control processing and performs the torque control of the drive motor 25 by the drive motor target torque TM*. Further, an electric generator torque control processing means (not specifically shown) of the electric generator controller 47 performs electric generator torque control processing and also performs the torque control of the electric generator 16 on the basis of the electric generator target torque TG* in step S7-5 and then processing returns to the point at which the subroutine was called.

Figure 16:
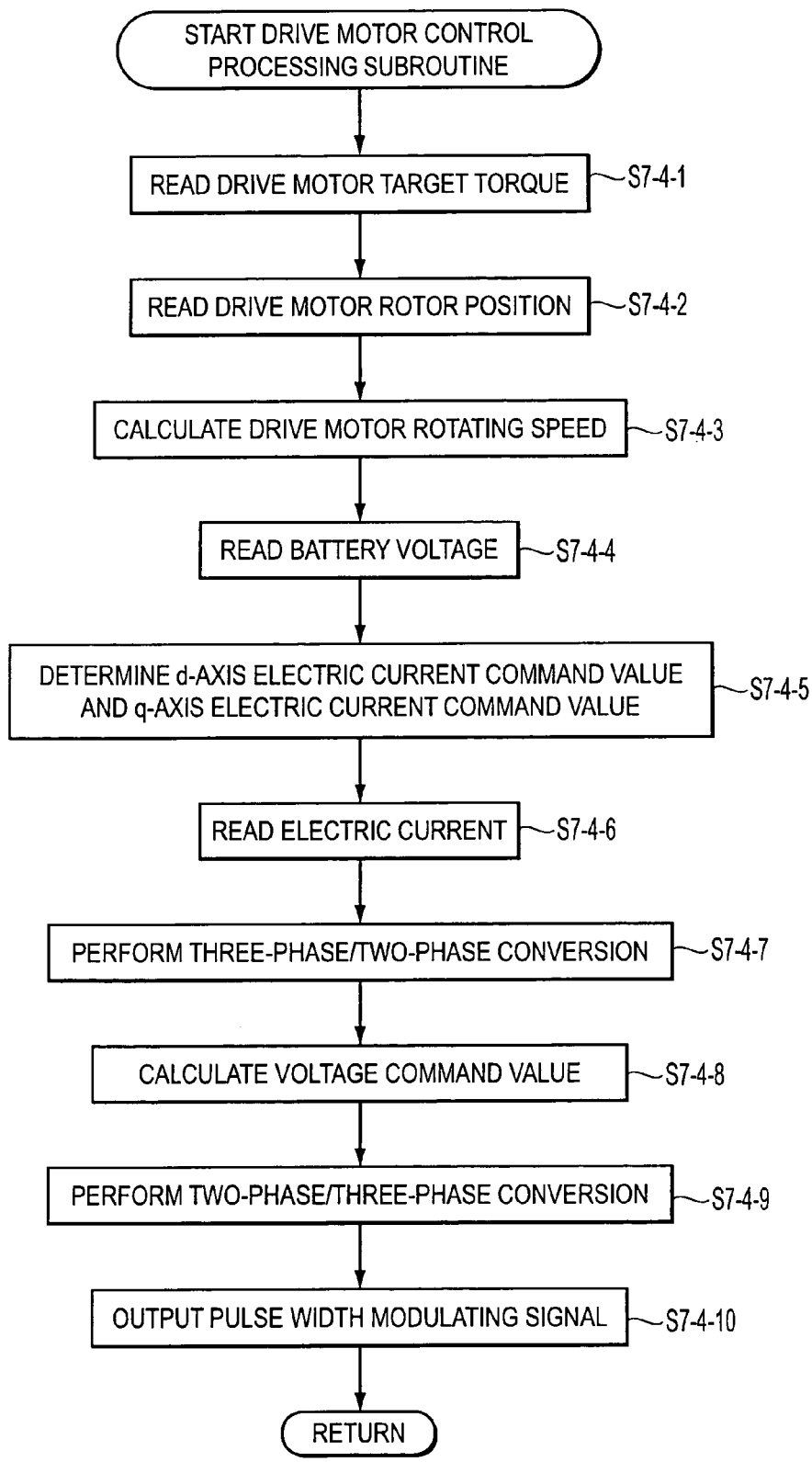
FIG. 16 is a flowchart of a subroutine of drive motor control processing in the first form of the invention.

Next, the subroutine for drive motor control processing found in each of steps S27 of FIG. 10 and S7-4 of FIG. 15 will be explained using FIG. 16.

First, in step S7-4-1, the drive motor control processing means reads the drive motor target torque TM*. Subsequently, the drive motor rotating speed calculation processing means reads the drive motor rotor position θM in step S7-4-2 and, in step S7-4-3, calculates the drive motor rotating speed NM by calculating the changing ratio ΔθM of the drive motor rotor position θM. The drive motor control processing means then reads the battery voltage VB in step S7-4-4. The actual measuring value is derived from the drive motor rotating speed NM and the battery voltage VB.

In step S7-4-5, the drive motor control processing means determines a d-axis electric current command value IMd* and a q-axis electric current command value IMq* by referring to an electric current command value map for the drive motor control recorded in the recorder of the drive motor controller 49 (FIG. 7) on the basis of the drive motor target torque TM*, the drive motor rotating speed NM and the battery voltage VB. An alternating electric current command value for the drive motor 25 is derived from the d-axis electric current command value IMd* and the q-axis electric current command value IMq*.

Further, in step S7-4-6 the drive motor control processing means reads electric currents IMU, IMV from the electric current sensors 68, 69 and calculates an electric current IMW where $$IMW = IMU - IMV$$

on the basis of the electric currents IMU, IMV. Similarly to the electric currents IMU, IMV, the electric current IMW can also be detected by an electric current sensor.

Subsequently, in step S7-4-7, an alternating electric current calculation processing means (not specifically shown) of the drive motor control processing means performs alternating electric current calculation processing and also performs three-phase/two-phase conversion, converts the electric currents IMU, IMV, IMW into a d-axis electric current IMd and a q-axis electric current IMq as alternating electric currents, and, thus, calculates the d-axis electric current IMd and the q-axis electric current IMq. In step S7-4-8, an alternating current voltage command value calculation processing means (not specifically shown) of the drive motor control processing means performs alternating current voltage command value calculation processing and calculates voltage command values VMd*, VMq* on the basis of the d-axis electric current IMd and q-axis electric current IMq, and the d-axis electric current command value IMd* and q-axis electric current command value IMq*. Further, in step S7-4-9, the drive motor control processing means performs two-phase/three-phase conversion and converts the voltage command values VMd*, VMq* into voltage command values VMU*, VMV*, VMW*. The drive motor control processing means further calculates, in step S7-4-10, pulse width modulating signals Su, Sv, Sw on the basis of the voltage command values VMU*, VMV*, VMW*, and outputs the pulse width modulating signals Su, Sv, Sw to drive processing means (not specifically shown) of the drive motor controller 49. The drive processing means performs drive processing and sends a driving signal SG2 to the inverter 29 on the basis of the pulse width modulating signals Su, Sv, Sw. An alternating current voltage command value for the drive motor 25 is derived from the voltage command values VMd*, VMq* and then the process returns to the point where the subroutine was called.

Figure 17:
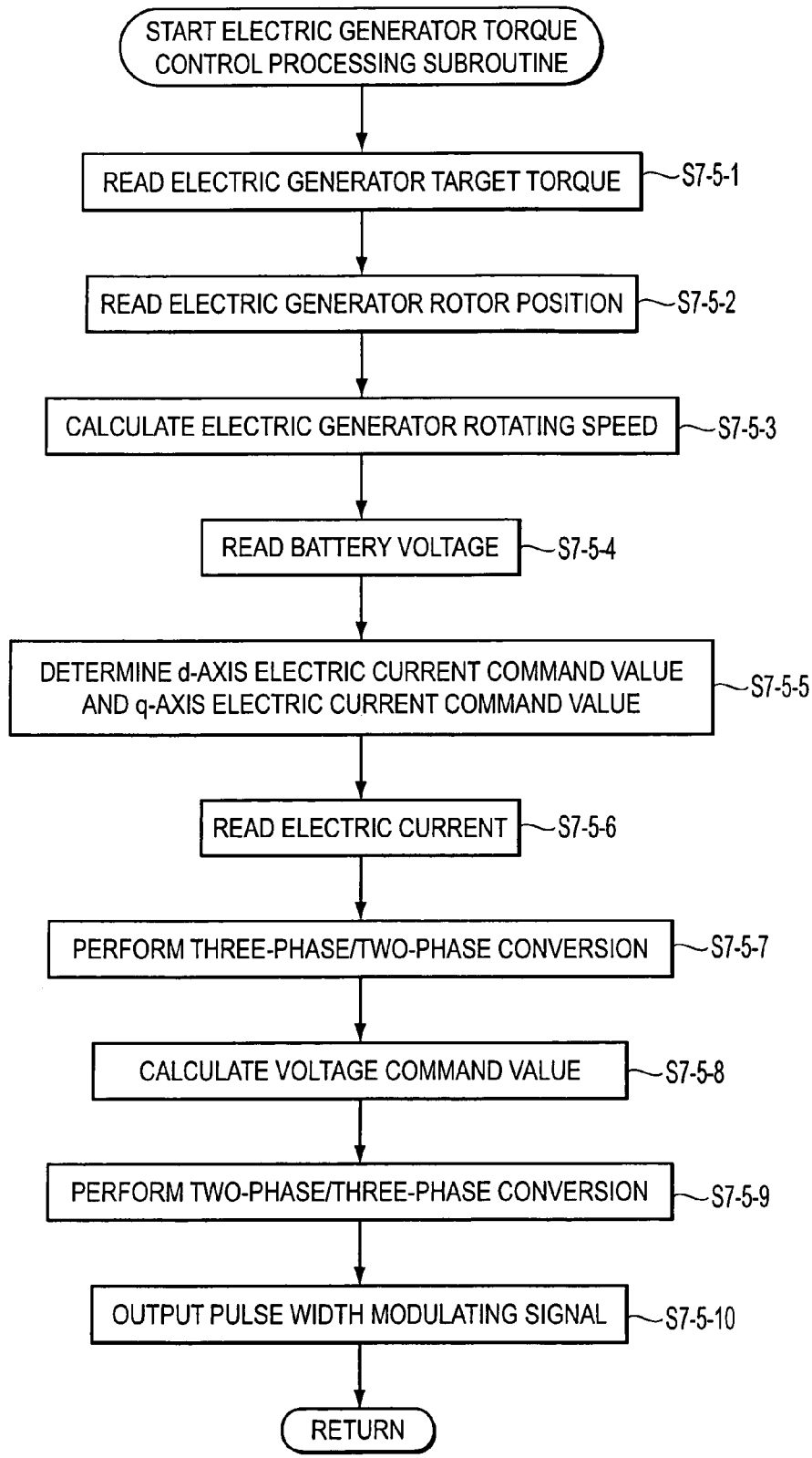
FIG. 17 is a flowchart of a subroutine of electric generator torque control processing in the first form of the invention.

A subroutine for electric generator torque control processing as found in the step S7-5 of FIG. 15 will be explained using FIG. 17.

First, the electric generator torque control processing means reads the electric generator target torque TG* in step S7-5-1. The electric generator rotating speed calculation processing means reads the electric generator rotor position θG in step S7-5-2 and then, in step S7-5-3, calculates the electric generator rotating speed NG on the basis of the electric generator rotor position θG. Subsequently, in step S7-5-4 the electric generator torque control processing means reads the battery voltage VB and in step S7-5-5 determines a d-axis electric current command value IGd* and a q-axis electric current command value IGq* by referring to an electric current command value map for the electric generator control recorded in the recorder of the electric generator controller 47 (FIG. 7) on the basis of the electric generator target torque TG*, the electric generator rotating speed NG, and the battery voltage VB. An alternating electric current command value for the electric generator 16 is constructed by the d-axis electric current command value IGd* and the q-axis electric current command value IGq*.

Further, the electric generator torque control processing means, in step S7-5-6, reads electric currents IGU, IGV from electric current sensors 66, 67, and calculates an electric current IGW where $$IGW = IGU - IGV$$

on the basis of the electric currents IGU, IGV. Similarly to the electric currents IGU, IGV, the electric current IGW can be also detected by an electric current sensor.

Subsequently, in step S7-5-7, the alternating electric current calculation processing means of the electric generator torque control processing means performs the alternating electric current calculation processing, also performs the three-phase/two-phase conversion, and calculates a d-axis electric current IGd and a q-axis electric current IGq by converting the electric currents IGU, IGV, IGW into the d-axis electric current IGd and the q-axis electric current IGq. The alternating current voltage command value calculation processing means of the electric generator torque control processing means then performs, in step S7-5-8, the alternating current voltage command value calculation processing and calculates voltage command values VGd*, VGq* on the basis of the d-axis electric current IGd and q-axis electric current IGq, and the d-axis electric current command value IGd* and q-axis electric current command value IGq*. Further, the electric generator torque control processing means performs the two-phase/three-phase conversion in step S7-5-9 and converts the voltage command values VGd*, VGq* into voltage command values VGU*, VGV*, VGW*. Then, in step S7-5-10 the electric generator torque control processing means calculates pulse width modulating signals Su, Sv, Sw on the basis of the voltage command values VGU*, VGV*, VGW*, and outputs the pulse width modulating signals Su, Sv, Sw to drive processing means (not specifically shown) of the electric generator controller 47. The drive processing means performs drive processing and sends a driving signal SG1 to the inverter 28 on the basis of the pulse width modulating signals Su, Sv, Sw. An alternating current voltage command value for the electric generator 16 is derived from the voltage command values VGd*, VGq* and processing returns to where the subroutine was called.

Figure 18:
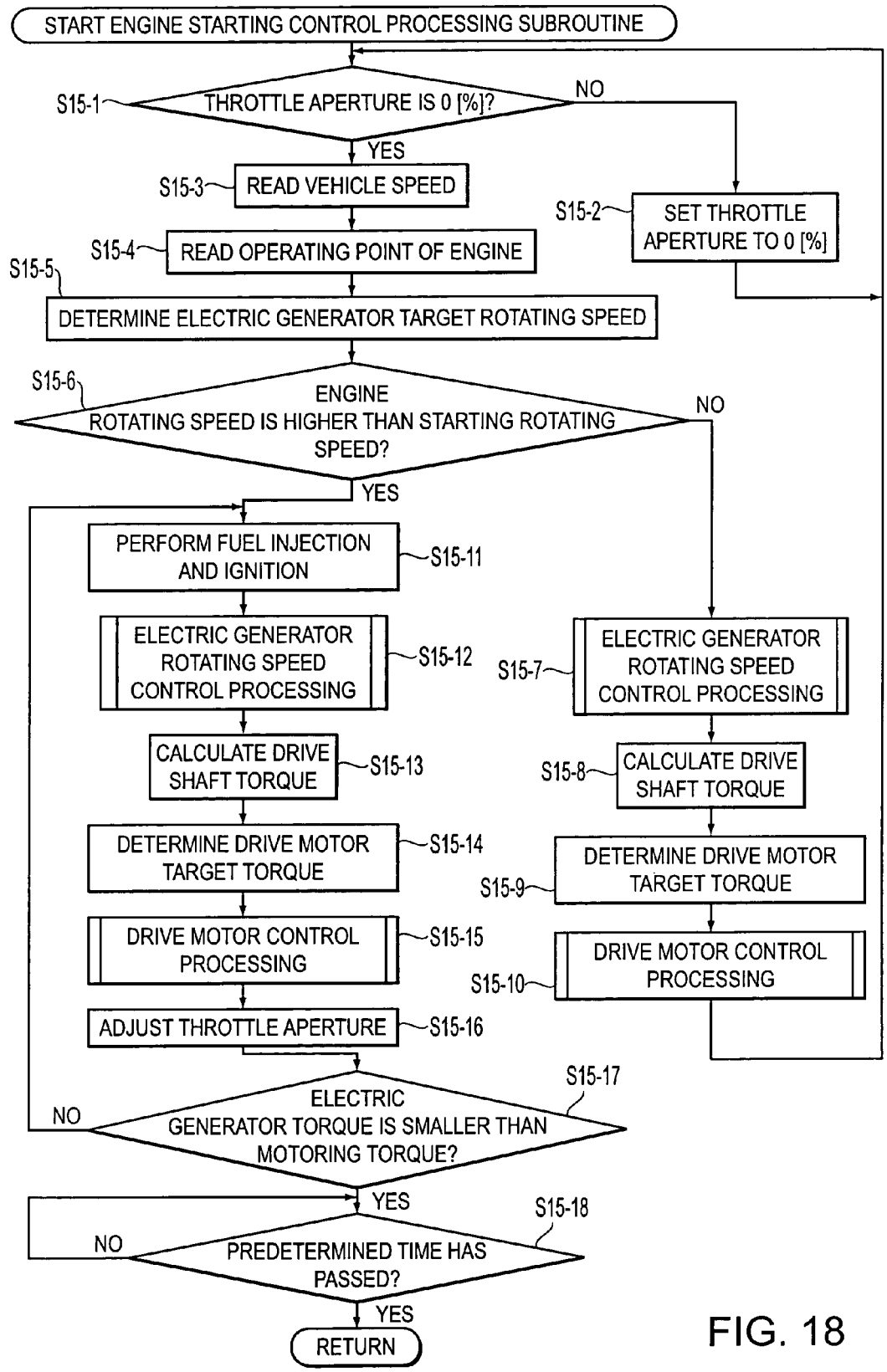
FIG. 18 is a flowchart of a subroutine of engine starting control processing in the first form of the invention.

Next, the subroutine for engine starting control processing, found in the step S15 of FIG. 9, will next be explained using FIG. 18.

In step S15-1, the engine starting control processing means reads the throttle aperture θ and determines whether it is 0[%]. After throttle aperture is 0[%], the process proceeds to step S15-3 and reads the vehicle speed V as calculated by the vehicle speed calculation processing means. Then, in step S15-4 the engine starting control processing means reads the operating point of the engine 11 (FIG. 7) determined in the engine target operating state setting processing.

Subsequently, in step S15-5 the electric generator target rotating speed calculation processing means performs electric generator target rotating speed calculation processing and reads the drive motor rotor position θM. The electric generator target rotating speed calculation processing means then calculates the ring gear rotating speed NR on the basis of the drive motor rotor position θM and the gear ratio γMR, and reads the engine target rotating speed NE* at the operating point. Further, the electric generator target rotating speed calculation processing means calculates the electric generator target rotating speed NG* by the rotating speed relation formula (1) on the basis of the ring gear rotating speed NR and the engine target rotating speed NE*.

In step S15-6 the engine controller 46 compares the engine rotating speed NE and a starting rotating speed NEth1 set in advance, and judges whether the engine rotating speed NE is higher than the starting rotating speed NEth1. When the engine rotating speed NE is higher than the starting rotating speed NEth1 (step S15-6 yes), the engine starting control processing means performs fuel injection and ignition in the engine 11 in step S15-11.

Subsequently, in step S15-12 the electric generator rotating speed control processing means performs the electric generator rotating speed control processing on the basis of the electric generator target rotating speed NG*, raises the electric generator rotating speed NG and, thus, raises the engine rotating speed NE.

The drive motor controller 49, in step S15-13, calculates, based on the electric generator torque, the drive shaft torque TR/OUT as executed in steps S25 to S27, determines the drive motor target torque TM* in step S15-14, and performs the drive motor control processing in step S115-15.

Further, in step S15-16, the engine starting control processing means adjusts the throttle aperture θ such that the engine rotating speed NE becomes the engine target rotating speed NE*. Next, in step S15-17, the engine starting control processing means judges whether the electric generator torque TG is smaller than a motoring torque TEth generated by starting the engine 11 so as to judge whether the engine 11 is normally operated. In step S15-18, when the electric generator torque TG is smaller than the motoring torque TEth (step S15-17 yes), the engine starting control processing means waits for the passage of a predetermined time in a state in which the electric generator torque TG is smaller than the motoring torque TEth. Then, the processing returns to the point where the subroutine was called and the process resumes.

Back in step S15-6, when the engine rotating speed NE is less than or equal to the starting rotating speed NEth1, the electric generator rotating speed control processing means performs the electric generator rotating speed control processing in step S15-7 on the basis of the electric generator target rotating speed NG*. Subsequently, as executed in steps S25 to S27, the drive motor controller 49 calculates, in step S15-8, the drive shaft torque TR/OUT, in step S15-9 determines the drive motor target torque TM*, and, in step S15-10, performs the drive motor control processing before returning to step S15-1.

Additionally, in step S15-1, if the throttle aperture is not 0[%], in step S15-2 the engine controller 46 sets the throttle aperture to 0[%] and processing continues at step S15-1.

Figure 19:
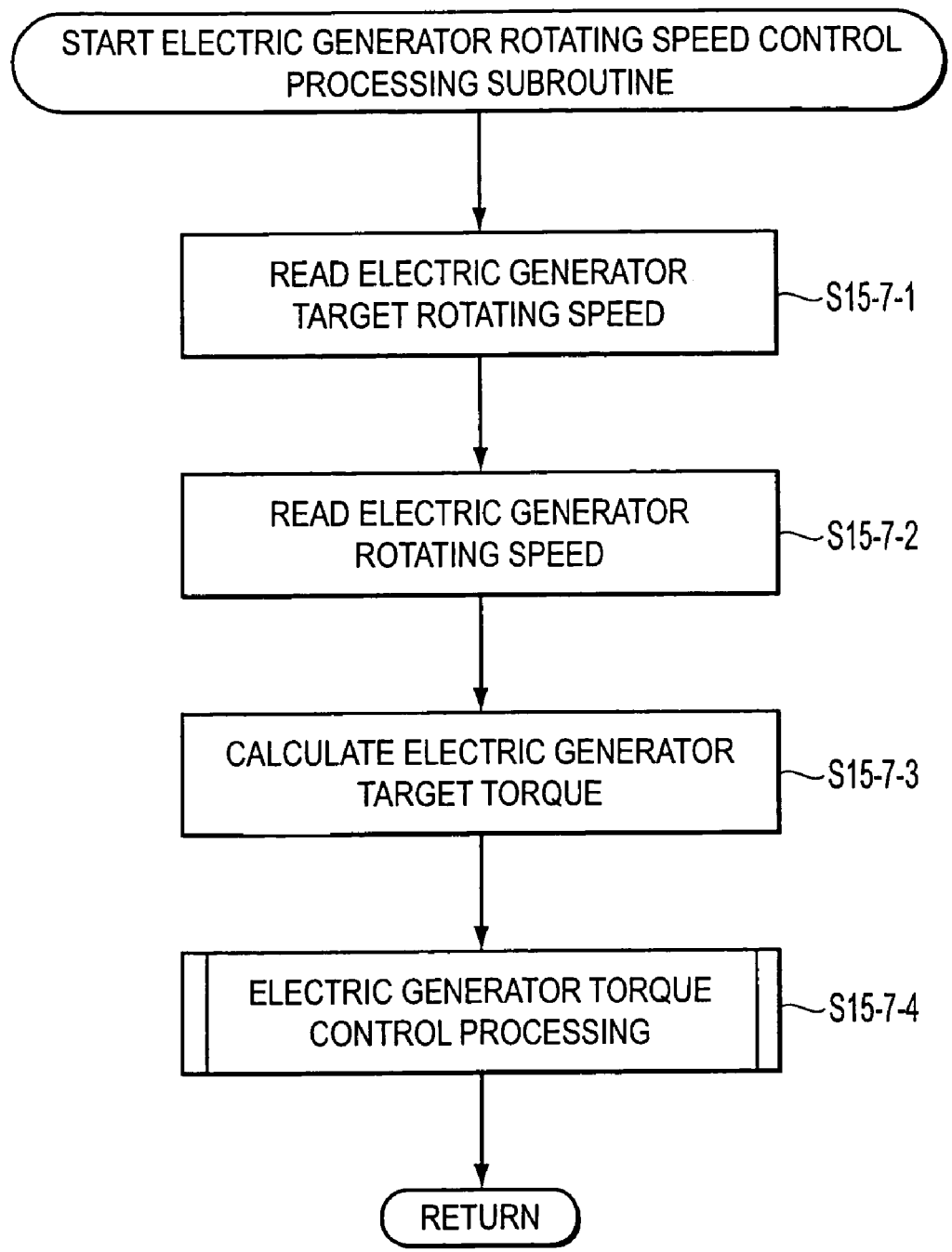
FIG. 19 is a flowchart of a subroutine of electric generator rotating speed control processing in the first form of the invention.

Next, a subroutine for electric generator rotating speed control processing found in each of step S23 of FIG. 10 and steps S15-7, S15-12 of FIG. 18 will be explained using FIG. 19.

First, in steps S15-7-1 and S15-7-2, the electric generator rotating speed control processing means reads the electric generator target rotating speed NG* and also reads the electric generator rotating speed NG. The electric generator rotating speed control processing means then, in step S15-7-3, calculates the electric generator target torque TG* by performing PI control on the basis of the differential rotating speed ΔNG between the electric generator target rotating speed NG* and the electric generator rotating speed NG. In this case, as the differential rotating speed ΔNG is increased, the electric generator target torque TG* is increased and its positive and negative signs are also considered.

Subsequently, in step S15-7-4 the electric generator torque control processing means performs the electric generator torque control processing of FIG. 17 and the torque control of the electric generator 16 (FIG. 7) is performed and processing of the subroutine ends with the processing returning to where the subroutine was called.

Figure 20:
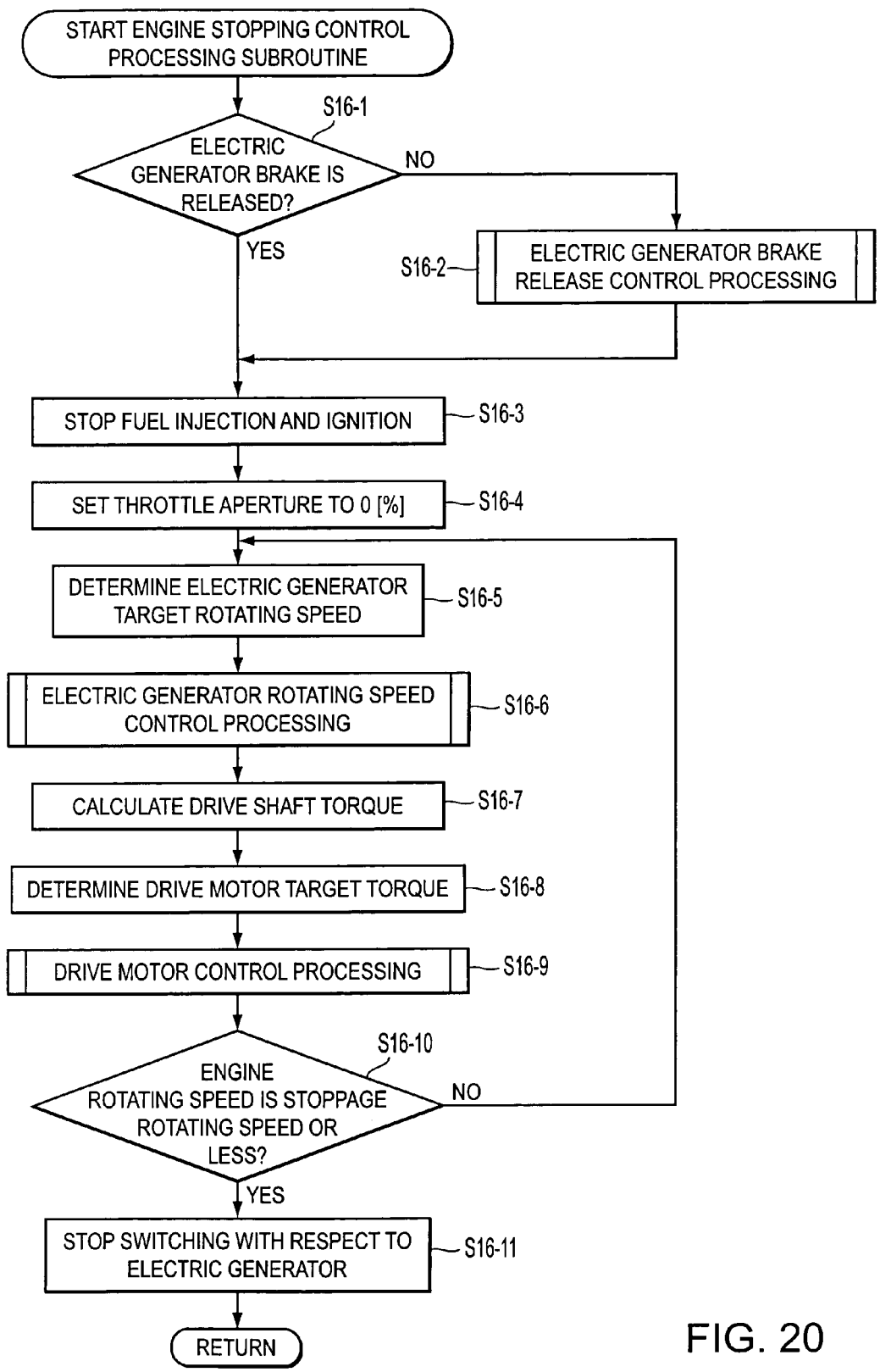
FIG. 20 is a flowchart of a subroutine of engine stoppage control processing in the first embodiment mode of the invention.

The subroutine for engine stopping control processing found in the step S16 of FIG. 9 will now be explained with reference to FIG. 20.

First, in step S16-1 the electric generator controller 47 (FIG. 7) judges whether the electric generator brake B is released. When the electric generator brake B is not released but is engaged, the processing proceeds to step S16-2 and electric generator brake release control processing means performs the electric generator brake release control processing and releases the electric generator brake B. Then processing proceeds to step S16-3.

Conversely, when the electric generator brake B is released, in step S16-3, the engine stopping control processing means stops the fuel injection and the ignition in the engine 11 and, in step S16-4, sets the throttle aperture θ to 0[%].

Subsequently, in step S16-5 the engine stopping control processing means reads the ring gear rotating speed NR and determines the electric generator target rotating speed NG* using the rotating speed relation formula (1) on the basis of the ring gear rotating speed NR and the engine target rotating speed NE* (0 [rpm]). After the electric generator controller 47 performs the electric generator rotating speed control processing of FIG. 19 in step S16-6, the drive motor controller 49 in step S16-7 calculates the drive shaft torque TR/OUT, in step S16-8 determines the drive motor target torque TM*, and in step S16-9 performs the drive motor control processing as executed in steps S25 to S27.

Next, the electric generator controller 47 judges whether the engine rotating speed NE is less than or equal to a stoppage rotating speed NEth2 in step S16-10. When the engine rotating speed NE is less than or equal to the stoppage rotating speed NEth2, the electric generator controller 47 executes step S16-11 and stops switching with respect to the electric generator 16 shutting down the electric generator 16. When the engine rotating speed NE is greater than the stoppage rotating speed NEth2 (step S16-10 no), processing returns to step S16-5. After step S16-11, processing returns to the point where the subroutine was called to continue processing.

Figure 21:
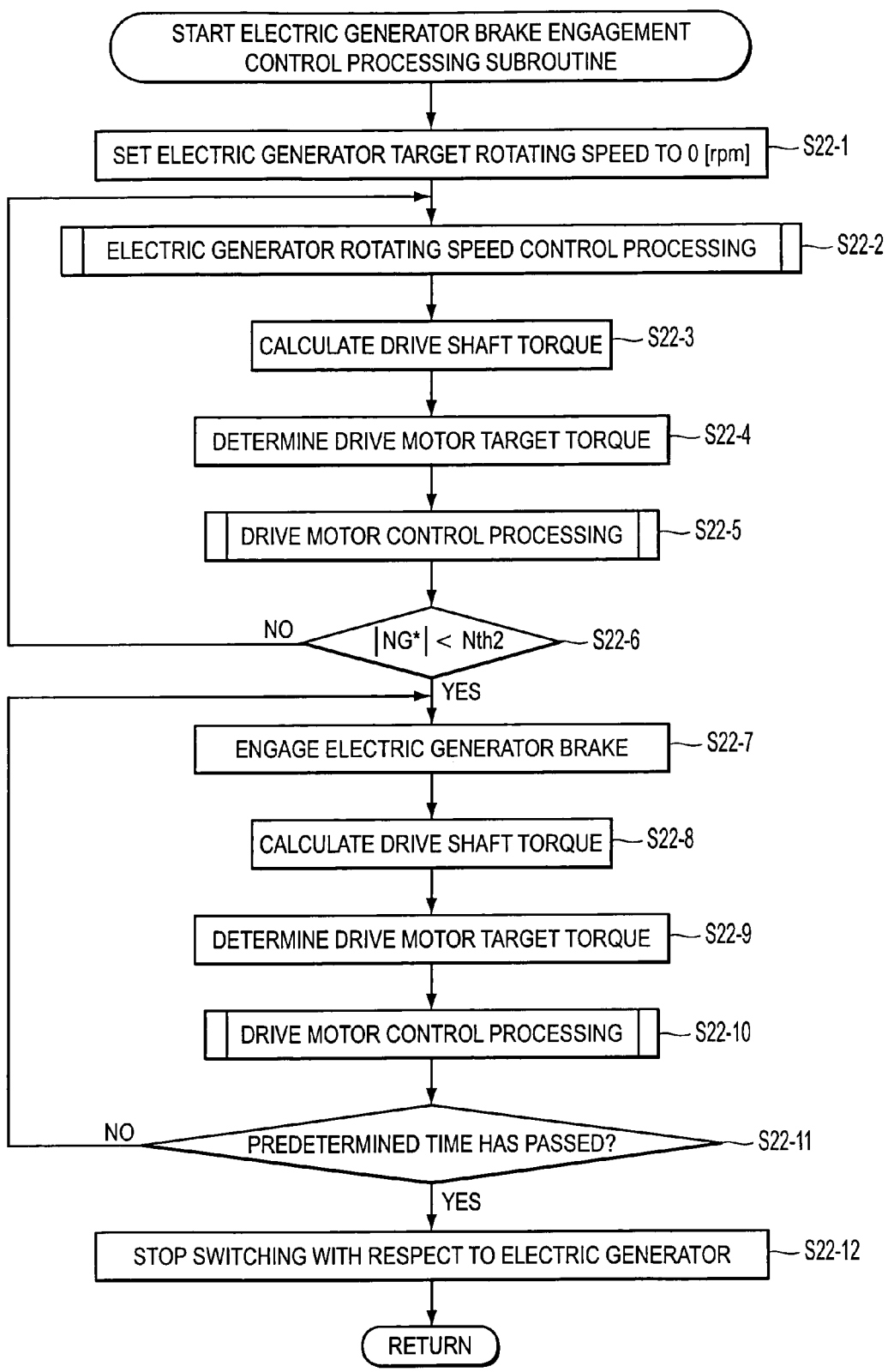
FIG. 21 is a flowchart of a subroutine of electric generator brake engagement control processing in the first form of the invention.

Next, the subroutine for electric generator brake engagement control processing found in the step S22 of FIG. 10 will be explained using FIG. 21.

First, in step S22-1 the electric generator brake engagement control processing means changes an electric generator brake request for requesting the engagement of the electric generator brake B (FIG. 7) from OFF to ON, and sets the electric generator target rotating speed NG* to 0 [rpm]. After the electric generator controller 47 performs the electric generator rotating speed control processing of FIG. 19 in step S22-2, the drive motor controller 49 calculates the drive shaft torque TR/OUT in step S22-3, determines the drive motor target torque TM* in step S22-4, and performs the drive motor control processing as executed in steps S25 to S27 in step S22-5.

Next, in step S22-6 the electric generator brake engagement control processing means judges whether the absolute value of the electric generator rotating speed NG is smaller than a predetermined second rotating speed Nth2 (e.g., 100 [rpm]). When the absolute value of the electric generator rotating speed NG is equal to or greater than the second rotating speed Nth2, the process returns to step S22-2, and when the absolute value of the electric generator rotating speed NG is smaller than the second rotating speed Nth2, the electric generator brake B is engaged in step S22-7. Subsequently, in step S22-8, as executed in steps S25 to S27, the drive motor controller 49 calculates the drive shaft torque TR/OUT, in step S22-9 determines the drive motor target torque TM*, and performs the drive motor control processing in step S22-10.

When in step S22-11 a predetermined time has then passed in the engaging state of the electric generator brake B, the electric generator brake engagement control processing means stops the switching with respect to the electric generator 16 and shuts down the electric generator 16 in step S22-12. When the predetermined time has not passed, processing returns to step S22-7. After step S22-12, processing returns to the point where the subroutine was called and then continues.

Figure 22:
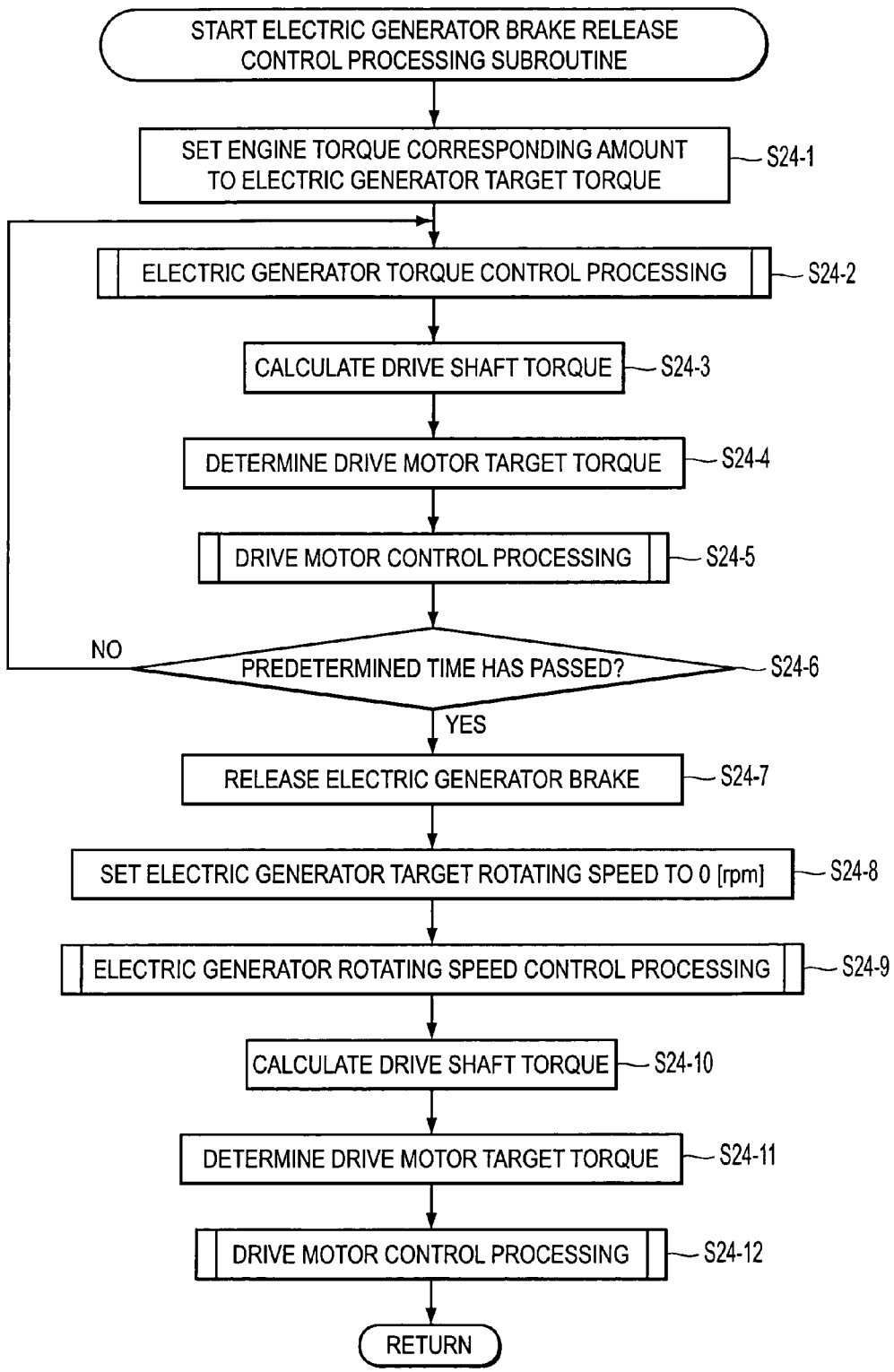
FIG. 22 is a flowchart of a subroutine of electric generator brake release control processing in the first form of the invention.

Next, the subroutine for electric generator brake release control processing found in step S24 of FIG. 10 will be explained using FIG. 22.

While the electric generator brake B (FIG. 7) is engaged in the electric generator brake engagement control processing, a predetermined engine torque TE is applied to the rotor 21 of the electric generator 16 as a reaction force. Accordingly, when the electric generator brake B is simply released, the electric generator torque TG and the engine torque TE are greatly changed as the engine torque TE is transmitted to the rotor 21, thereby generating a shock.

Therefore, in step S24-1, in the engine controller 46, the engine torque TE transmitted to the rotor 21 is calculated. The electric generator brake release control processing means reads a torque corresponding to the calculated engine torque TE, i.e., an engine torque corresponding amount, and sets the engine torque corresponding amount as the electric generator target torque TG*. Subsequently, after the electric generator torque control processing means performs the electric generator torque control processing of FIG. 17 in step S24-2, the drive motor controller 49 in step S24-3 calculates the drive shaft torque TR/OUT, in step S24-4 determines the drive motor target torque TM*, and in step S24-5 performs the drive motor control processing as executed in steps S25 to S27.

The processing then checks whether a predetermined time has passed in step S24-6. If the predetermined time has not passed, processing is returned to step S24-2. When the predetermined time has passed after the drive motor control processing is started, the electric generator brake release control processing means in step S24-7 releases the electric generator brake B and, in step S24-8, sets the electric generator target rotating speed NG* to 0 [rpm]. Thereafter, the electric generator rotating speed control means performs the electric generator rotating speed control processing of FIG. 19 in step S24-9. Subsequently, as executed in steps S25 to S27, the drive motor controller 49 calculates the drive shaft torque TR/OUT in step S24-10, in step S24-11 determines the drive motor target torque TM*, and performs the drive motor control processing in step S24-12. The engine torque corresponding amount is calculated by learning the torque ratio of the electric generator torque TG with respect to the engine torque TE. Then, processing returns to the point where the subroutine was called.

As mentioned, in the engine target operating state setting processing, as shown in FIG. 13, points A1 to A3, Am are determined as operating points of the engine 11 as the engine target operating state. At the points A1 to A3, Am, lines PO1, PO2,—showing a vehicle request output PO, and an optimum fuel cost curve L, highest in efficiency of the engine 11 in each of accelerator pedal positions AP1 to AP6, cross each other. Further, engine torques TE1 to TE3, TEm at the operating points are determined as the engine target torque TE*.

The electric generator target rotating speed calculation processing means calculates the electric generator target rotating speed NG* on the basis of the engine target rotating speed NE*. The electric generator rotating speed control processing means controls the electric generator torque TG such that the electric generator rotating speed NG becomes the electric generator target rotating speed NG*.

When the electric generator rotating speed NG is suddenly raised and the electric generator torque TG is reduced as the battery voltage VB is reduced, it is difficult to restrain the engine torque TE and the engine 11 races and an excessive rotating state is caused.

Therefore, the electric generator target rotating speed calculation processing means refers to an electric generator target rotating speed limiting map recorded in the recorder of the vehicle controller 51, limits the electric generator target rotating speed NG*, and performs excessive rotation preventing control. Therefore, in the electric generator target rotating speed limiting map, an electric generator maximum rotating speed NGmax is set and recorded in correspondence to the battery voltage VB. The electric generator maximum rotating speed NGmax is reduced as the battery voltage VB is reduced and the electric generator maximum rotating speed NGmax is raised as the battery voltage VB is raised. The electric generator target rotating speed calculation processing means limits the electric generator target rotating speed NG* so as not to exceed the electric generator maximum rotating speed NGmax. Thus, the engine 11 is prevented from entering the excessive rotating state.

When the electric generator target rotating speed NG* is limited in the electric generator target rotating speed calculation processing, an electric generator torque limit processing means of the engine control processing means performs electric generator torque limit processing and limits the electric generator torque TG such that no actual electric generator rotating speed NG is higher than the electric generator target rotating speed NG*. The engine torque limit processing means of the engine control processing means performs engine torque limit processing and limits the engine torque TE by a deficient amount of the electric generator torque TG with respect to the engine torque TE as the electric generator torque TG is limited.

Figure 23:
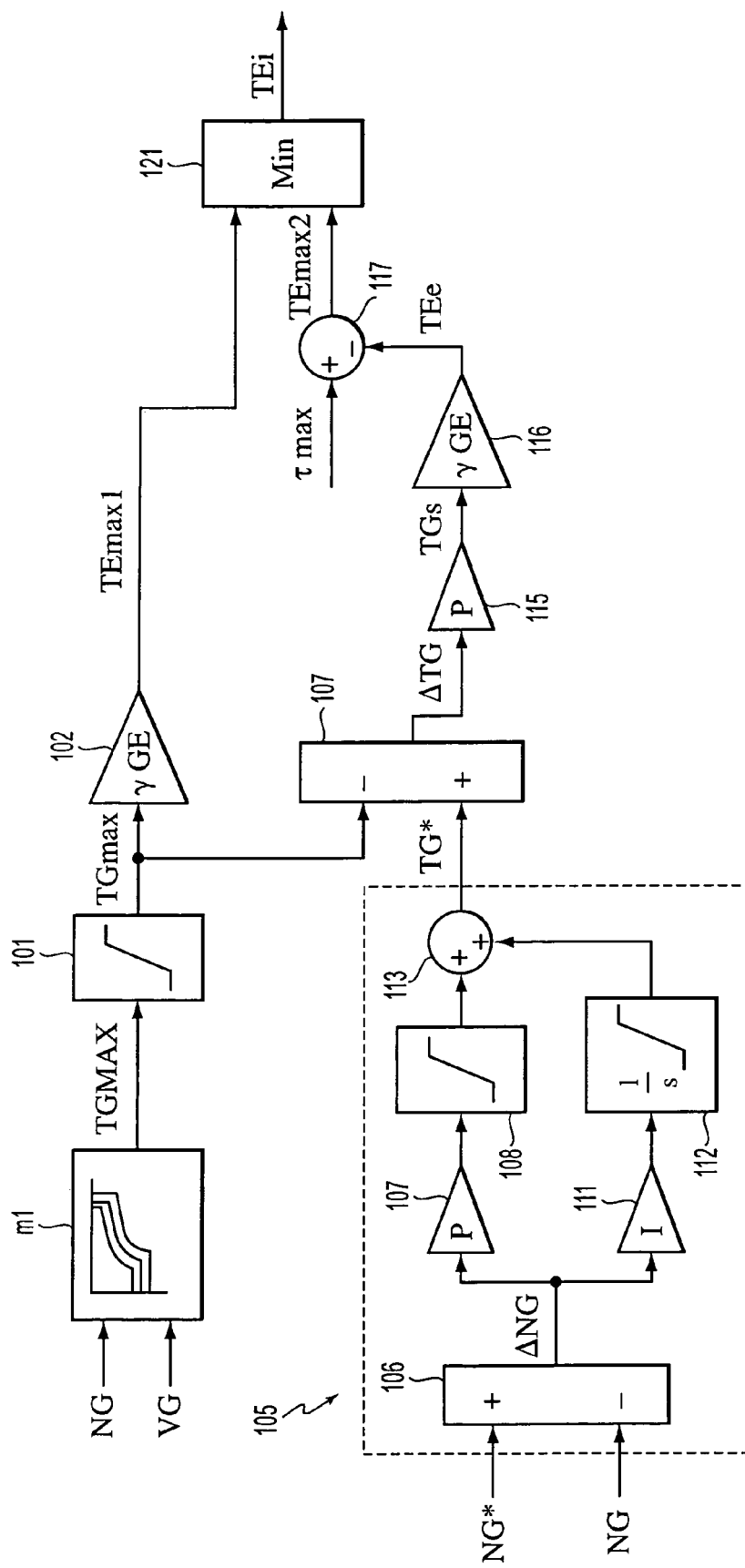
FIG. 23 is a diagram showing the operation of engine torque limit processing in the first form of the invention.

FIG. 23 is a diagram showing the operation of the engine torque limit processing in the first form of the invention. In this case, an electric generator maximum torque calculation processing means of the electric generator torque limit processing means performs electric generator maximum torque calculation processing and reads the electric generator rotating speed NG, the electric generator inverter voltage VG and the temperature of the inverter 28 (FIG. 7). The electric generator maximum torque calculation processing means of the electric generator torque limit processing means further calculates the electric generator maximum torque TGmax on the basis of the electric generator rotating speed NG, the electric generator inverter voltage VG and the temperature of the inverter 28. Therefore, the electric generator maximum torque calculation processing means refers to an electric generator torque limiting map m1 recorded in the recorder of the engine controller 46, and calculates a maximum value TGMAX of the electric generator torque TG corresponding to the electric generator rotating speed NG and the electric generator inverter voltage VG. Subsequently, a limiter 101, as a limit processing means of the electric generator maximum torque calculation processing means, performs limit processing and reads the temperature of the inverter 28 and calculates the electric generator maximum torque TGmax on the basis of the maximum value TGMAX and the temperature of the inverter 28.

In this form of the invention, the electric generator maximum torque TGmax is calculated on the basis of the electric generator rotating speed NG, the electric generator inverter voltage VG and the temperature of the inverter 28. However, the electric generator maximum torque TGmax can be also calculated independently of the electric generator rotating speed NG, the electric generator inverter voltage VG and the temperature of the inverter 28.

Subsequently, an arithmetic unit 102, as a first engine maximum torque calculation processing means of the engine torque limit processing means, performs first engine maximum torque calculation processing and reads the electric generator maximum torque TGmax. The arithmetic unit 102 further calculates and sets first engine maximum torque TEmax 1 showing a maximum value of the engine torque TE by multiplying the electric generator maximum torque TGmax by a gear ratio γGE from the electric generator 16 to the engine 11. In this form of the invention, the electric generator inverter voltage VG is used to calculate the maximum value TGMAX, but the battery voltage VB can be also used.

As mentioned above, when the electric generator maximum torque TGmax is set by limiting the electric generator torque TG on the basis of the electric generator rotating speed NG, the electric generator inverter voltage VG and the temperature of the inverter 28, it is difficult to restrain the engine torque TE by the electric generator torque TG when the electric generator maximum torque TGmax is smaller than the electric generator target torque TG* calculated in the electric generator rotating speed control processing and the engine 11 is operated in the engine target torque TE* calculated on the basis of the electric generator target torque TG*.

Therefore, a subtracter 103, as a differential torque calculation processing means of the engine torque limit processing means, performs differential torque calculation processing and reads the electric generator maximum torque TGmax from the limiter 101 and also reads the electric generator target torque TG* from an electric generator target torque calculating section 105 constituting the electric generator target torque calculation processing means. The subtracter 103 also calculates a differential torque ΔTG by subtracting the electric generator maximum torque TGmax from the electric generator target torque TG*.

The electric generator target torque calculating section 105 has a subtracter 106, an arithmetic unit (P) 107, a limiter 108 as a limit processing means, an arithmetic unit (I) 111, a limiter (1/s) 112 as a limit processing means, and an adder 113. The subtracter 106 reads the electric generator target rotating speed NG* and the electric generator rotating speed NG and calculates a speed deviation ΔNG where $$\Delta NG=NG^*-NG.$$

The arithmetic unit 107 calculates a proportional component by multiplying the speed deviation ΔNG by a predetermined gain. The limiter 108 limits the proportional component. The arithmetic unit 111 multiplies the speed deviation ΔNG by a gain gI and calculates an integrating component by integrating the multiplied speed deviation. The limiter 112 limits the integrating component. The adder 113 adds the limited proportional component and the integrating component.

When the subtracter 103 calculates the differential torque ΔTG, a second engine maximum torque calculation processing means of the engine torque limit processing means performs second engine maximum torque calculation processing and limits the engine target torque TE* by the differential torque ΔTG, and calculates and sets a second engine maximum torque TEmax2 showing a maximum value of the engine torque TE. Therefore, the second engine maximum torque calculation processing means has an arithmetic unit (K) 115 as a deficient electric generator torque calculation processing means, an arithmetic unit 116 as an excessive engine torque calculation processing means, and a subtracter 117 as an engine torque adjustment processing means.

The arithmetic unit 115 performs deficient electric generator torque calculation processing and reads the differential torque ΔTG and multiplies the differential torque ΔTG by a predetermined coefficient ε (e.g., 1.2 in this embodiment mode). The arithmetic unit 115 calculates a deficient amount of the electric generator torque TG, i.e., deficient electric generator torque TGs where $$TGs = \epsilon \cdot \Delta TG.$$

The arithmetic unit 116 performs excessive engine torque calculation processing and reads the deficient electric generator torque TGs and multiplies the deficient electric generator torque TGs by a gear ratio γGE from the electric generator 16 to the engine 11. Thus, the arithmetic unit 116 calculates an excessive amount of the engine torque TE, i.e., excessive engine torque TEe where $$TEe = \gamma GE \cdot TGs.$$

The subtracter 117 performs engine torque adjustment processing and adjusts a request engine torque τ max showing the engine torque TE required in the engine 11 on the basis of the deficient electric generator torque TGs. Therefore, the subtracter 117 judges whether the excessive engine torque TEe has a positive value. When the excessive engine torque TEe has a positive value, the subtracter 117 calculates a second engine maximum torque TEmax2 by subtracting the excessive engine torque TEe from the request engine torque τ max when the engine torque limit processing is started. In contrast to this, when the excessive engine torque TEe has a negative value, it is not necessary to limit the engine torque TE because the electric generator target torque TG* is smaller than the electric generator maximum torque TGmax.

The engine maximum torque calculation processing means 91 (FIG. 1) is made up of the first and second engine maximum torque calculation processing means. The engine maximum torque calculation processing means 91 calculates plural engine maximum torques, first and second engine maximum torques TEmax1, TEmax2 in this form on the basis of, at least, the first engine maximum torque TEmax1 and the deficient electric generator torque TGs. Further, the request engine torque τ max is set to a fixed value.

Subsequently, a comparator (Min) 121, as an engine limit torque calculation processing means of the engine torque limit processing means, performs engine limit torque calculation processing and reads the first and second engine maximum torques TEmax1, TEmax2. The comparator 121 further calculates and outputs a minimum value of the first and second engine maximum torques TEmax1, TEmax2 as an engine limit torque TEi.

When the engine limit torque TEi is calculated in the engine torque limit processing in this way, the engine control processing means controls the engine torque TE such that no engine target torque TE* exceeds the engine limit torque TEi, and the engine control processing means limits the throttle aperture θ of the engine 11. Accordingly, the engine 11 is prevented from attaining the excessive rotating state.

Thus, in this form of the invention, the engine limit torque TEi is calculated on the basis of the differential torque ΔTG between the electric generator target torque TG* and the electric generator maximum torque TGmax. The engine torque TE is controlled such that no engine target torque TE* exceeds the engine limit torque TEi.

Accordingly, when the hybrid type vehicle is intended to run in a cold place, the internal resistance of the battery 43 is increased and the change in the battery voltage VB is increased. When the battery voltage VB is suddenly reduced as the hybrid type vehicle is suddenly accelerated, the electric generator torque TG is suddenly reduced, but the engine target torque TE* is correspondingly reduced. Accordingly, it is possible to reliably prevent the engine 11 from attaining the excessive rotating state.

When the hybrid type vehicle runs across roads having frictional coefficients different from each other, the shaft of the drive wheel 37 is locked and the ring gear rotating speed TR is suddenly reduced e.g., when the hybrid type vehicle is moved from a road having a small frictional coefficient, such as ice on its surface, to a road having a large frictional coefficient, such as asphalt. Thus, the electric generator rotating speed NG is suddenly raised and the electric generator torque TG is suddenly reduced. However, in this case, the engine target torque TE* is also correspondingly reduced. Accordingly, it is possible to reliably prevent the engine 11 from entering the excessive rotating state.

The engine limit torque TEi is calculated on the basis of a minimum value of the plural engine maximum torques, the first and second engine maximum torques TEmax1, TEmax2 in this form of the invention. Therefore, the engine limit torque TEi can be reliably calculated even when there is an individual difference in the engine 11, the electric generator 16, etc. and there is a calculation error in the electric generator target torque TG*, the electric generator maximum torque TGmax, etc. Therefore, the engine torque TE can be sufficiently restrained by the electric generator torque TG. Accordingly, it is possible to reliably prevent the engine 11 from entering the excessive rotating state.

Next, a second form of the invention for setting the request engine torque to a variable value will be explained. In this second form, elements having the same structure as the first form are designated by the same reference numerals, and their explanations are omitted. The effects of the invention obtained by arranging the same structure are similar to those of the first form.

Figure 24:
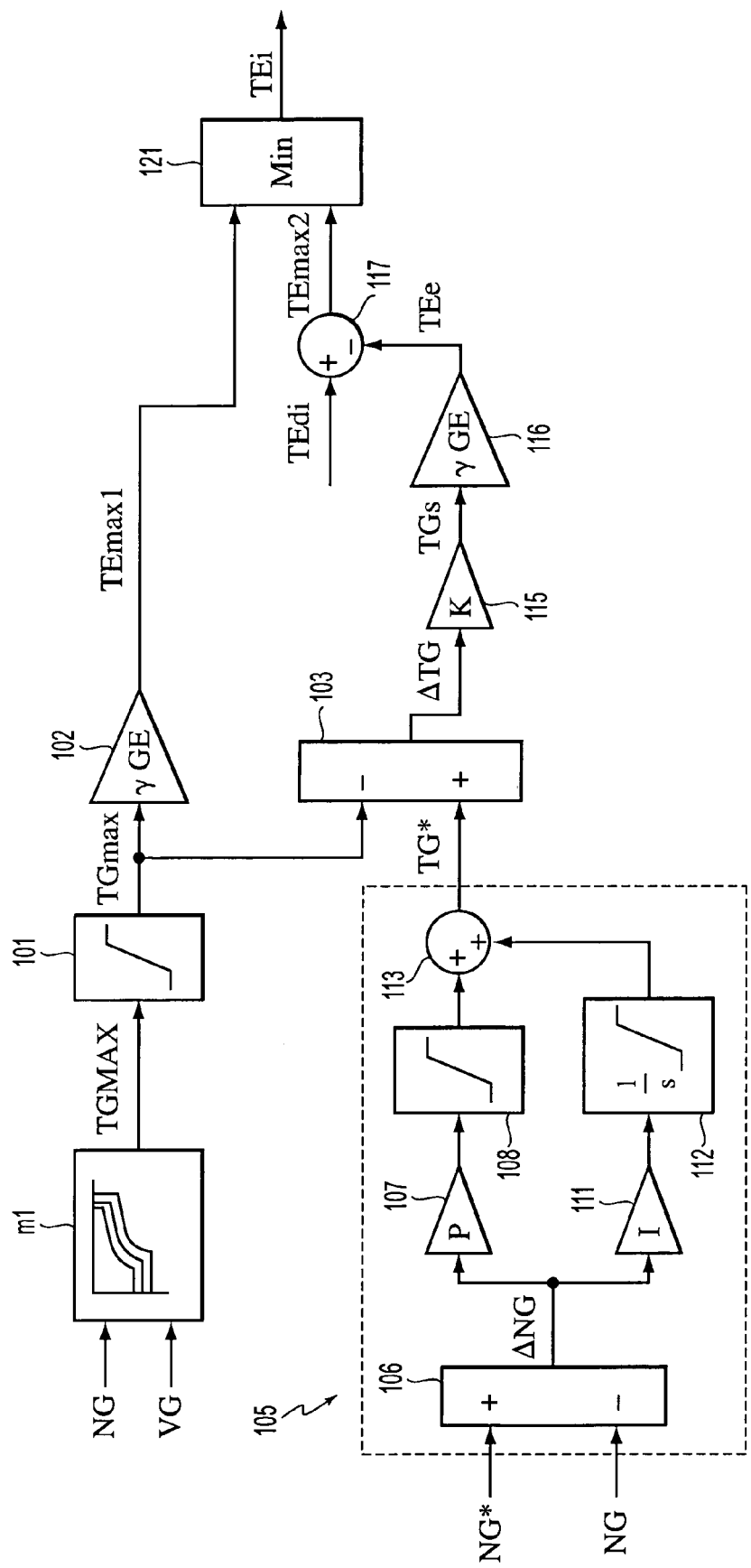
FIG. 24 is a diagram showing the operation of engine torque limit processing in a second form of the invention.

FIG. 24 is a view showing the operation of engine torque limit processing in the second form of the invention.

In this case, the request engine torque TEdi sent to a subtracter 117, as an engine torque adjustment processing means, is set to a variable value. Therefore, a predetermined value greater than the first engine maximum torque TEmax1 is set as an initial value of the request engine torque TEdi. This initial value can be set to a fixed value set in advance.

When the electric generator rotating speed control is normally performed, the electric generator target torque TG* is smaller than the electric generator maximum torque TGmax. Therefore, the differential torque ΔTG and the excessive engine torque TEe have negative values. Accordingly, when the subtracter 117 performs engine torque adjustment processing and the second engine maximum torque TEmax2 is calculated by subtracting the excessive engine torque TEe from the request engine torque TEdi, the second engine maximum torque TEmax2 becomes greater than the first engine maximum torque TEmax1. Accordingly, a comparator 121, as an engine limit torque calculation processing means, calculates and outputs the first engine maximum torque TEmax1 as the engine limit torque TEi.

Further, when the hybrid type vehicle is intended to operate in a cold place and the hybrid type vehicle runs across roads having frictional coefficients different from each other, etc., the electric generator target torque TG* is greater than the electric generator maximum torque TGmax. Accordingly, the differential torque ΔTG and the excessive engine torque TEe have positive values. At this time, the subtracter 117 reads the engine target torque TE* as the request engine torque TEdi when the electric generator target torque TG* is greater than the electric generator maximum torque TGmax, in a moment in which the electric generator target torque TG* is greater than the electric generator maximum torque TGmax in this form. Thereafter, the value of the request engine torque TEdi is fixed until the engine torque limit processing is terminated.

The invention is not limited to the above forms, but can be variously modified on the basis of the spirit of the invention. These modifications are not excluded from the scope of the invention.

As explained above in detail, in accordance with the invention, the hybrid type vehicle driving controller has the engine maximum torque calculation processing means for calculating plural engine maximum torques showing a maximum value of the engine torque, and the engine limit torque calculation processing means for calculating a minimum value of the respective engine maximum torques as engine limit torque.

In this case, because the minimum value of the respective engine maximum torques is calculated as the engine limit torque, it is possible to reliably prevent the engine from attaining the excessive rotating state.

Further, because the engine limit torque is calculated on the basis of the minimum value of the plural engine maximum torques, the engine limit torque can be reliably calculated even when there is an individual difference in the engine, the electric generator, etc. and there are calculation errors of the electric generator target torque, the electric generator maximum torque, etc. Therefore, the engine torque can be sufficiently restrained by the electric generator torque. Accordingly, it is possible to reliably prevent the engine from attaining the excessive rotating state.

What is claimed is:

1. A hybrid type vehicle driving controller comprising electric generator maximum torque calculation processing means for calculating electric generator maximum torque showing a maximum value of electric generator torque; electric generator target torque calculation processing means for calculating electric generator target torque showing a target value of the electric generator torque; deficient electric generator torque calculation processing means for calculating a deficient amount of the electric generator torque on the basis of the difference between said electric generator target torque and the electric generator maximum torque; engine maximum torque calculation processing means for calculating plural engine maximum torques on the basis of at least said electric generator maximum torque and the deficient amount of the electric generator torque; and engine limit torque calculation processing means for calculating a minimum value of said respective engine maximum torques as engine limit torque.

2. The hybrid type vehicle driving controller according to claim 1, wherein said electric generator maximum torque calculation processing means calculates the electric generator maximum torque on the basis of an electric generator rotating speed, a direct current voltage and the temperature of an inverter.

3. The hybrid type vehicle driving controller according to claim 1, wherein said electric generator target torque calculation processing means calculates the electric generator target torque on the basis of an electric generator rotating speed and an electric generator target rotating speed showing a target value of the electric generator rotating speed.

4. The hybrid type vehicle driving controller according to claim 1, wherein the hybrid type vehicle driving controller further comprises engine torque adjustment processing means for adjusting request engine torque required in the engine on the basis of the deficient amount of said electric generator torque.

5. The hybrid type vehicle driving controller according to claim 1, wherein said engine maximum torque calculation processing means has first engine maximum torque calculation processing means for calculating the engine maximum torque on the basis of at least said electric generator maximum torque, and also has second engine maximum torque calculation processing means for calculating the engine maximum torque on the basis of the deficient amount of said electric generator torque.

6. The hybrid type vehicle driving controller according to claim 5, wherein the hybrid type vehicle driving controller further comprises engine torque adjustment processing means for adjusting request engine torque required in the engine on the basis of the deficient amount of said electric generator torque.

7. The hybrid type vehicle driving controller according to claim 6, wherein said electric generator maximum torque calculation processing means calculates the electric generator maximum torque on the basis of an electric generator rotating speed, a direct current voltage and the temperature of an inverter.

8. The hybrid type vehicle driving controller according to claim 6, wherein said electric generator target torque calculation processing means calculates the electric generator target torque on the basis of an electric generator rotating speed and an electric generator target rotating speed showing a target value of the electric generator rotating speed.

9. The hybrid type vehicle driving controller according to claim 6, wherein said request engine torque is set to a fixed value.

10. The hybrid type vehicle driving controller according to claim 6, wherein said request engine torque is set to engine target torque when the electric generator target torque is greater than the electric generator maximum torque.

11. The hybrid type vehicle driving controller according to claim 5, wherein said electric generator maximum torque calculation processing means calculates the electric generator maximum torque on the basis of an electric generator rotating speed, a direct current voltage and the temperature of an inverter.

12. The hybrid type vehicle driving controller according to claim 5, wherein said electric generator target torque calculation processing means calculates the electric generator target torque on the basis of an electric generator rotating speed and an electric generator target rotating speed showing a target value of the electric generator rotating speed.

13. The hybrid type vehicle driving controller according to claim 4, wherein said request engine torque is set to engine target torque when the electric generator target torque is greater than the electric generator maximum torque.

14. The hybrid type vehicle driving controller according to claim 4, wherein said electric generator maximum torque calculation processing means calculates the electric generator maximum torque on the basis of an electric generator rotating speed, a direct current voltage and the temperature of an inverter.

15. The hybrid type vehicle driving controller according to claim 4, wherein said electric generator target torque calculation processing means calculates the electric generator target torque on the basis of an electric generator rotating speed and an electric generator target rotating speed showing a target value of the electric generator rotating speed.

16. The hybrid type vehicle driving controller according to claim 4, wherein said request engine torque is set to a fixed value.

* * * * *